US011834616B2

(12) United States Patent
Mountainland et al.

(10) Patent No.: US 11,834,616 B2
(45) Date of Patent: Dec. 5, 2023

(54) EFFICIENT HYDROPROCESSING AND SOLVENT DEASPHALTING OF HEAVY OIL WITH SEQUENTIAL ADDITION OF DISPERSED CATALYST

(71) Applicant: HYDROCARBON TECHNOLOGY & INNOVATION, LLC, Lawrenceville, NJ (US)

(72) Inventors: David M. Mountainland, Princeton, NJ (US); Brett M. Silverman, Salt Lake City, UT (US)

(73) Assignee: HYDROCARBON TECHNOLOGY & INNOVATION, LLC, Lawrenceville, NJ (US)

( * ) Notice: Subject to any disclaimer, the term of this patent is extended or adjusted under 35 U.S.C. 154(b) by 0 days.

(21) Appl. No.: 17/864,200

(22) Filed: Jul. 13, 2022

(65) Prior Publication Data

US 2023/0070688 A1     Mar. 9, 2023

Related U.S. Application Data

(60) Provisional application No. 63/233,882, filed on Aug. 17, 2021.

(51) Int. Cl.
    *C10G 67/14*     (2006.01)
    *B01J 37/20*     (2006.01)
    (Continued)

(52) U.S. Cl.
    CPC .............. *C10G 67/14* (2013.01); *B01D 3/06* (2013.01); *B01D 3/10* (2013.01); *B01D 3/143* (2013.01);
    (Continued)

(58) Field of Classification Search
    CPC .............. C10G 67/14; C10G 2300/202; C10G 2300/205; C10G 2300/206;
    (Continued)

(56) References Cited

U.S. PATENT DOCUMENTS

5,578,197 A    11/1996   Cyr et al.
6,511,937 B1    1/2003   Bearden et al.
(Continued)

FOREIGN PATENT DOCUMENTS

CA          2386575 A1    4/2001
WO        01/27225 A1    4/2001

OTHER PUBLICATIONS

"Solvent deasphalting (sda)", Retrieved from www.edl.poerner.de, Jan. 2014, pp. 2.
(Continued)

*Primary Examiner* — Randy Boyer
*Assistant Examiner* — Juan C Valencia
(74) *Attorney, Agent, or Firm* — Workman Nydegger

(57) ABSTRACT

Combined hydroprocessing and solvent deasphalting with sequential addition of a dispersed catalyst to process heavy oil without increasing equipment fouling. An example method includes: hydroprocessing heavy oil containing dispersed catalyst particles to yield upgraded heavy oil; subjecting a resid portion of the upgraded heavy oil to solvent deasphalting to produce DAO and pitch; and hydroprocessing the deasphalted oil containing dispersed catalyst particles to yield upgraded deasphalted oil. An example system includes: mixer(s) for blending catalyst precursor with heavy oil to form conditioned feedstock; heater to decompose catalyst precursor and form dispersed catalyst particles in situ; hydroprocessing reactor(s) for hydroprocessing heavy oil to yield upgraded heavy oil; solvent deasphalting system to separate DAO from pitch; mixer(s) for blending
(Continued)

catalyst precursor with deasphalted oil to form conditioned deasphalted oil; heater to decompose catalyst precursor and form dispersed catalyst particles in situ; and hydroprocessing reactor(s) for hydroprocessing deasphalted oil yield upgraded deasphalted oil.

30 Claims, 12 Drawing Sheets

(51) Int. Cl.
| | |
|---|---|
| *B01J 35/02* | (2006.01) |
| *B01J 35/00* | (2006.01) |
| *B01J 19/24* | (2006.01) |
| *B01D 3/06* | (2006.01) |
| *B01D 3/10* | (2006.01) |
| *B01D 3/14* | (2006.01) |
| *B01J 27/04* | (2006.01) |

(52) U.S. Cl.
CPC ............. *B01J 19/245* (2013.01); *B01J 27/04* (2013.01); *B01J 35/0013* (2013.01); *B01J 35/026* (2013.01); *B01J 37/20* (2013.01); *B01J 2219/0004* (2013.01); *C10G 2300/202* (2013.01); *C10G 2300/205* (2013.01); *C10G 2300/206* (2013.01); *C10G 2300/208* (2013.01); *C10G 2300/4075* (2013.01)

(58) Field of Classification Search
CPC ...... C10G 2300/208; C10G 2300/4075; B01D 3/06; B01D 3/10; B01D 3/143; B01J 19/245; B01J 27/04; B01J 35/0013; B01J 35/026; B01J 37/20; B01J 2219/0004
See application file for complete search history.

(56) References Cited

U.S. PATENT DOCUMENTS

| | | | |
|---|---|---|---|
| 9,284,499 B2 | 3/2016 | Van Wees et al. | |
| 2012/0152805 A1 | 6/2012 | Chabot et al. | |
| 2015/0361360 A1 | 12/2015 | Harris et al. | |
| 2017/0355913 A1* | 12/2017 | Mountainland | ........ C10G 49/12 |
| 2018/0119027 A1* | 5/2018 | Baldassari | ............. C10G 47/26 |

OTHER PUBLICATIONS

Elshout R. et al., "Upgrading the bottom of the barrel", Hydrocarbon processing, Mar. 2018, pp. 8.
International Search Report and Written Opinion received for PCT Patent Application No. PCT/US2022/037671, dated Oct. 14, 2022, 11 pages.

* cited by examiner

EFFICIENT HYDROPROCESSING AND SOLVENT DEASPHALTING OF HEAVY OIL WITH SEQUENTIAL ADDITION OF DISPERSED CATALYST

CROSS REFERENCE TO RELATED APPLICATION

This Application claims the benefit of U.S. Provisional Application No. 63/233,882, filed Aug. 7, 2022, which is incorporated herein by reference in its entirety.

BACKGROUND OF THE INVENTION

1. The Field of the Invention

The invention relates to heavy oil hydroprocessing and solvent deasphalting methods and systems, including the use of a sequentially added dispersed catalyst to increase efficiency.

2. The Relevant Technology

Converting heavy oil into useful end products involves extensive processing, such as reducing the boiling point of the heavy oil, increasing the hydrogen-to-carbon ratio, and removing impurities such as metals, sulfur, nitrogen, and coke precursors. Examples of hydrocracking processes using conventional heterogeneous catalysts to upgrade atmospheric tower bottoms include fixed-bed hydroprocessing, ebullated-bed hydroprocessing, and moving-bed hydroprocessing. Noncatalytic upgrading processes for upgrading vacuum tower bottoms include thermal cracking, such as delayed coking, flexicoking, visbreaking, and solvent extraction.

There is an ever-increasing demand to more efficiently utilize low quality heavy oil feedstocks and extract fuel values therefrom. Low quality feedstocks are characterized as including relatively high quantities of hydrocarbons that nominally boil at or above 524° C. (975° F.). They also contain relatively high concentrations of asphaltenes, sulfur, nitrogen and metals. High boiling fractions derived from these low quality feedstocks typically have a high molecular weight (often indicated by higher density and viscosity) and/or low hydrogen/carbon ratio, which is related to the presence of high concentrations of undesirable components, including asphaltenes and carbon residue. Asphaltenes and carbon residue are difficult to process and commonly cause fouling of conventional catalysts and hydroprocessing equipment because they contribute to the formation of coke and sediment.

Low quality heavy oil feedstocks contain high concentrations of asphaltenes, carbon residue, sulfur, nitrogen, and metals. Examples include heavy crude, oil sands bitumen, and residuum left over from conventional refinery process. Residuum (or "resid") can refer to atmospheric tower bottoms and vacuum tower bottoms. Atmospheric tower bottoms can have a boiling point of at least 343° C. (650° F.) although it is understood that the cut point can vary among refineries and be as high as 380° C. (716° F.). Vacuum tower bottoms (also known as "resid pitch" or "vacuum residue") can have a boiling point of at least 524° C. (975° F.), although it is understood that the cut point can vary among refineries and be as high as 538° C. (1000° F.) or even 565° C. (1050° F.).

By way of comparison, Alberta light crude contains about 9 vol % vacuum residue, while Lloydminster heavy oil contains about 41 vol % vacuum residue, Cold Lake bitumen contains about 50 vol % vacuum residue, and Athabasca bitumen contains about 51 vol % vacuum residue. As a further comparison, a relatively light oil such as Dansk Blend from the North Sea region only contains about 15 vol % vacuum residue, while a lower-quality European oil such as Ural contains more than 30 vol % vacuum residue, and an oil such as Arab Medium is even higher, with about 40 vol % vacuum residue.

In a given ebullated bed system, the rate of production of converted products is often limited by fouling. When attempts are made to increase production of converted products beyond a certain practical limit, the rate of fouling of heat exchangers and other process equipment becomes too rapid, requiring more frequent shutdowns for maintenance and cleaning. A refinery operator typically relates the observed rate of equipment fouling to measurements of sediment production and arrives at an operating sediment limit, above which the refinery will avoid operating the ebullated bed hydrocracker. Thus, sediment production and equipment fouling place practical upper limits on conversion and the rate of production of converted products. Such problems are exacerbated when using lower quality heavy oil feedstocks.

Some have used oil soluble catalysts and precursors as a source of additional catalyst metal to improve the performance and stability of an ebullated bed reactor. U.S. Pat. No. 5,372,705 to Bhattacharya et al. ("Bhattacharya") discloses a dual catalyst system comprising a porous supported catalyst in combination with an oil soluble catalyst, such as metal salts of aliphatic carboxylic acids. To increase stability of the ebullated bed reactor, Bhattacharya requires the use of 5-20% by weight of an aromatic heavy oil additive, such as heavy cycle gas oil (HCGO). U.S. Publication No. 2005/0241991 A1 to Lott et al. ("Lott") discloses a dual catalyst system comprising a porous supported catalyst in combination with an oil soluble catalyst precursor that forms a colloidal or molecular catalyst in situ when properly mixed prior to decomposition. The Examples in Lott used between 100-300 ppm of colloidal or molecular molybdenum sulfide catalyst to achieve the beneficial results. Lott teaches that the colloidal or molecular catalyst preferentially associates with the asphaltene molecules, which are difficult to hydrocrack using the porous supported catalyst because size exclusion inhibits diffusion of large asphaltene molecules into the catalyst pores. Lott teaches that association of the colloidal or molecular molybdenum sulfide catalyst with the asphaltene molecules beneficially increases conversion of asphaltenes compared to using the porous supported catalyst by itself Delayed coking and solvent de-asphalting (SDA) are sometimes used to remove metals, asphaltenes, and other sediment-forming and equipment-fouling materials to yield "cleaner" distillates and liquids that are less likely to cause equipment fouling when further processed. Delayed coking can be used to extract a quantity of distillable and liquid hydrocarbons from asphaltenes and other coke-forming materials, with the end products being distillates, liquids, and petroleum coke, with metals, sediment, and other non-distillable materials remaining in the coke. Solvent de-asphalting (SDA) can alternatively be used to remove metals, asphaltenes, and other insolubles, which end up in a waste pitch product, in order to provide a de-asphalted hydrocarbon feedstock that is less likely to form coke and sediment during hydroprocessing, which can reduce equipment fouling and frequency of system cleanouts.

However, delayed coking and SDA remove both upgradable and non-upgradable hydrocarbons, reducing the net production of useful hydrocarbons. Delayed coking and SDA also remove catalytic metals that might otherwise assist in promoting beneficial upgrading reactions. Thus, while delayed coking and SDA can be useful in removing hydrocarbons that are not upgradable, as well as metals and other impurities that can cause equipment fouling, they also produce waste end products that cannot be further upgraded into useful hydrocarbon liquids. However, such end products contain significant quantities of hydrocarbons that could otherwise have been upgraded into useful fuels instead of being converted into low value coke or pitch end products. They also contain catalytic metals that could have otherwise promoted beneficial upgrading reactions instead of being removed as part of the coke or pitch waste products.

Thus, there remains a need to find ways to more efficiently hydroprocess heavy oil and increase conversion without increasing equipment fouling by asphaltenes, metals, and other insolubles.

SUMMARY

Disclosed herein are methods and systems for hydroprocessing heavy oil, which combine solvent deasphalting with sequential addition of a dispersed catalyst in order to more efficiently hydroprocess heavy oil and increase conversion without increasing equipment fouling by asphaltenes, metals, and other insolubles.

An example method for hydroprocessing heavy oil comprises:
(1) adding a first quantity of catalyst precursor to heavy oil and heating the heavy oil to form first dispersed metal sulfide catalyst particles in situ within the heavy oil;
(2) hydroprocessing the heavy oil containing the first dispersed metal sulfide catalyst particles at hydroprocessing conditions to yield upgraded heavy oil containing converted hydrocarbons;
(3) subjecting at least a portion of the upgraded heavy oil to solvent deasphalting to produce deasphalted oil (DAO) and pitch;
(4) adding a second quantity of catalyst precursor to the deasphalted oil and heating the deasphalted oil to form second dispersed metal sulfide catalyst particles in situ within the deasphalted oil; and
(5) hydroprocessing the deasphalted oil containing the second dispersed metal sulfide catalyst particles at hydroprocessing conditions to yield upgraded deasphalted oil containing converted hydrocarbons.

An example system for hydroprocessing heavy oil comprises:
(1) one or more mixers for blending a first quantity of catalyst precursor with heavy oil to form a conditioned heavy oil that, when heated to a temperature above a decomposition temperature of the catalyst precursor, forms first dispersed metal sulfide catalyst particles in situ within the heavy oil;
(2) one or more hydroprocessing reactors configured to hydroprocess the heavy oil containing the first dispersed metal sulfide catalyst particles at hydroprocessing conditions to yield upgraded heavy oil containing converted hydrocarbons;
(3) a solvent deasphalting system configured to receive at least a portion of the upgraded heavy oil and solvent and perform solvent deasphalting to produce deasphalted oil (DAO) and pitch;
(4) one or more mixers for blending a second quantity of catalyst precursor with the deasphalted oil to form a conditioned deasphalted oil that, when heated to a temperature above the decomposition temperature of the catalyst precursor, forms second dispersed metal sulfide catalyst particles in situ within the deasphalted oil; and
(5) one or more hydroprocessing reactors configured to hydroprocess the deasphalted oil at hydroprocessing conditions to yield upgraded deasphalted oil containing converted hydrocarbons.

In some embodiments, the heavy oil can be hydroprocessed in one or more ebullated bed reactors that utilize the first dispersed metal sulfide catalyst particles in combination with a heterogenous ebullated bed catalyst to produce the upgraded heavy oil. Instead of, or in addition to, the one or more ebullated bed reactors, the heavy oil can be hydroprocessed in one or more slurry phase reactors that utilize the first dispersed metal sulfide catalyst particles, alone or in combination with a conventional slurry catalyst, and/or one or more fixed bed reactors that utilize the first dispersed metal sulfide catalyst particles in combination with a heterogenous fixed bed catalyst.

In some embodiments, the deasphalted oil can be hydroprocessed in one or more ebullated bed reactors that utilize the second dispersed metal sulfide catalyst particles in combination with a heterogenous ebullated bed catalyst to produce the upgraded deasphalted oil. Instead of, or in addition to the one or more ebullated bed reactors, the deasphalted oil can be hydroprocessed in one or more slurry phase reactors that utilize the second dispersed metal sulfide catalyst particles, alone or in combination with a conventional slurry catalyst, and/or one or more fixed bed reactors that utilize the second dispersed metal sulfide catalyst particles in combination with a heterogenous fixed bed catalyst.

Following hydroprocessing of the heavy oil and prior to solvent deasphalting, the upgraded heavy oil can be separated into one or more lower boiling hydrocarbon fractions and one or more liquid hydrocarbon fractions, with at least a portion of the one or more liquid hydrocarbon fractions being the feed material that is subjected to solvent deasphalting. For example, the upgraded heavy oil can be separated by one or more of hot separation, atmospheric distillation, or vacuum distillation.

In some embodiments, solvent deasphalting comprises:
(1) introducing at least a portion of the one or more liquid hydrocarbon fractions and solvent, such as at least one paraffinic solvent, into an extractor unit;
(2) removing a first stream containing deasphalted oil and a first portion of solvent from the extractor unit and subjecting the first stream to flash separation followed by DAO vacuum stripping to produce the deasphalted oil and first recovered solvent;
(3) removing a second stream containing pitch and a second portion of solvent from the extractor unit and subjecting the second stream to heat, flash separation, and pitch vacuum stripping to produce the pitch and second recovered solvent; and
(4) recycling at least a portion of the first recovered solvent and the second recovered solvent to the extractor, optionally with make-up solvent.

In some embodiments, the first quantity of catalyst precursor added to the heavy oil is greater than the second quantity of catalyst precursor added to the deasphalted oil. For example, the first quantity of catalyst precursor added to the heavy oil can be greater than the second quantity of catalyst precursor added to the deasphalted oil by at least about 25%, at least about 50%, at least about 75%, at least about 150%, at least about 300%, at least about 600%, at least about 1200%, or at least about 2000%.

In some embodiments, the heavy oil includes a higher concentration of dispersed metal sulfide catalyst particles during hydroprocessing than the deasphalted oil. For example, the concentration of dispersed metal sulfide catalyst particles in the heavy oil during hydroprocessing can be greater than the concentration of dispersed metal sulfide catalyst particles in the deasphalted oil during hydroprocessing by at least about 5%, at least about 10%, at least about 15%, at least about 30%, at least about 50%, or at least about 100%.

As an example of how the combined hydroprocessing and deasphalting methods and systems with dispersed metal sulfide catalyst particles more efficiently hydroprocess heavy oil, the total quantity of catalyst precursor required to produce a given quantity of converted products using combined hydroprocessing and solvent deasphalting as disclosed herein is less than the total quantity catalyst precursor required to produce the same quantity of converted products in the absence of solvent deasphalting and sequential addition of dispersed metal sulfide catalyst particles, such as a hydroprocessing method or system that utilizes a dual catalyst system in an ebullated bed reactor but omits solvent deasphalting and sequential addition of dispersed metal sulfide catalyst particles. For example, the total quantity of catalyst precursor required to produce the given quantity of converted products is reduced by at least about 2.5%, at least about 5%, at least about 10%, at least about 20%, at least about 30%, or at least about 50%, compared to the total quantity catalyst precursor required to produce the same quantity of converted products in a hydroprocessing method or system that utilizes a dual catalyst system in an ebullated bed reactor but omits solvent deasphalting and sequential addition of dispersed metal sulfide catalyst particles.

As another example of how the combined improved hydroprocessing and solvent deasphalting methods and systems that utilize dispersed metal sulfide catalyst particles more efficiently convert heavy oil into upgraded materials, the total quantity of pitch produced by solvent deasphalting after hydroprocessing the heavy oil in the presence of the dispersed metal sulfide catalyst particles is less than the total quantity of pitch produced by solvent deasphalting after hydroprocessing heavy oil but omitting the use of dispersed metal sulfide catalyst particles. For example, the total quantity of pitch produced by solvent deasphalting after hydroprocessing the heavy oil in the presence of the dispersed metal sulfide catalyst particles is reduced by at least about 2.5%, at least about 5%, at least about 10%, at least about 15%, or at least about 20%, compared to the total quantity of pitch produced by solvent deasphalting after hydroprocessing the heavy oil using the dispersed metal sulfide catalyst particles.

It has been found that the addition or formation of a second quantity of dispersed metal sulfide catalyst particles to or in the deasphalted oil can be advantageous when at least a portion the first quantity of dispersed metal sulfide particles remains in the pitch after solvent deasphalting—that is, when the deasphalted oil does not include all or oven a majority of the first quantity of dispersed metal sulfide catalyst particles contained in the upgraded heavy oil following hydroprocessing. It has been found that at least about 20%, at least about 30%, at least about 40%, at least about 50%, at least about 60%, at least about 70%, or at least about 80%, of the first dispersed metal sulfide catalyst particles remains in the pitch after solvent deasphalting, such that the deasphalted oil contains a depleted quantity of the dispersed metal sulfide catalyst particles as a result of being removed in the pitch. In some cases, essentially all of the first dispersed metal sulfide catalyst particles remain in the pitch and essentially none remains in the deasphalted oil.

Because the pitch can contain a substantial quantity of dispersed metal sulfide catalyst particles, it can be advantageous in some embodiments to recycle at least a portion of the pitch by adding it to the heavy oil to be hydroprocessed in order to provide supplemental dispersed metal sulfide catalyst particles in addition to the first dispersed metal sulfide catalyst particles. The amount of recycled pitch can be selected so that the benefit of including more dispersed metal sulfide catalyst particles outweighs the detriments caused by adding pitch to the heavy oil.

Compared to hydroprocessing heavy oil in an ebullated bed reactor using a dual catalyst system comprising a heterogenous catalyst and dispersed metal sulfide catalyst particles, but that omits solvent deasphalting, the disclosed process and system that combine hydroprocessing of heavy oil and deasphalted oil using dispersed metal sulfide catalyst particles and solvent deasphalting permits operation of the ebullated bed reactors at higher overall severity than in the absence of solvent deasphalting.

For example, the disclosed method and system can involve an increase in operating temperature of one or more ebullated bed reactors of at least 2.5° C., at least 5° C., at least 7.5° C., or at least 10° C. compared to hydroprocessing without solvent deasphalting and sequential addition of dispersed metal sulfide catalyst particles.

In addition, or alternatively, the disclosed method and system can involve an increase in throughput of heavy oil of at least 2.5%, at least 5%, at least 10%, or at least 20% compared to hydroprocessing without solvent deasphalting and sequential addition of dispersed metal sulfide catalyst particles.

In addition, or alternatively, the disclosed method and system can involve an increase in conversion of heavy oil of at least 2.5%, at least 5%, at least 7.5%, at least 10%, or at least 15% compared to hydroprocessing without solvent deasphalting and sequential addition of dispersed metal sulfide catalyst particles.

Compared to hydroprocessing heavy oil in an ebullated bed reactor using a dual catalyst system comprising a heterogenous catalyst and dispersed metal sulfide catalyst particles but that omits solvent deasphalting, the disclosed process and system that combines hydroprocessing of heavy oil with solvent deasphalting and sequential addition of a dispersed metal sulfide catalyst can decrease the rate of equipment fouling. In some embodiments, the disclosed process and system can reduce the rate of equipment fouling by at least 5%, at least 10%, at least 15%, or at least 20% compared to equipment fouling using the same catalyst system at the same overall rate of production of converted products but that omits solvent deasphalting.

The rate of equipment fouling can be measured by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnarounds.

In some embodiments, the dispersed metal sulfide catalyst particles are less than 1 µm in size, or less than about 500 nm in size, or less than about 250 nm in size, or less than about 100 nm in size, or less than about 50 nm in size, or less than about 25 nm in size, or less than about 10 nm in size, or less than about 5 nm in size.

In some embodiments, the dispersed metal sulfide catalyst particles can be formed in situ within the heavy oil from a catalyst precursor. By way of example, the dispersed metal sulfide catalyst particles can be formed by blending a catalyst precursor into an entirety of heavy oil or deasphalted oil prior to thermal decomposition of the catalyst precursor and formation of active metal sulfide catalyst particles in situ.

By way of further example, embodiments may include mixing a catalyst precursor with a diluent hydrocarbon to form a diluted precursor mixture, followed by blending the diluted precursor mixture with the heavy oil to form conditioned heavy oil, and heating the conditioned heavy oil to decompose the catalyst precursor and form the dispersed metal sulfide catalyst particles in situ within the heavy oil.

Similarly, embodiments may include mixing a catalyst precursor with a diluent hydrocarbon to form a diluted precursor mixture, followed by blending the diluted precursor mixture with the deasphalted oil to form conditioned deasphalted oil, and heating the conditioned deasphalted oil to decompose the catalyst precursor and form the dispersed metal sulfide catalyst particles in situ within the deasphalted oil.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction and Definitions

Disclosed herein are methods and systems for hydroprocessing heavy oil that combine solvent deasphalting with sequential addition of dispersed catalyst in order to more efficiently hydroprocess heavy oil and increase the rate of production of converted products without increasing equipment fouling by asphaltenes, metals, and other insolubles.

The terms "asphaltene" and "asphaltenes" refer to materials in heavy oil resid that are typically insoluble in paraffinic solvents, such as propane, butane, pentane, hexane, and heptane. Asphaltenes can include sheets of condensed ring compounds held together by heteroatoms, such as sulfur, nitrogen, oxygen, and metals. Asphaltenes broadly include a wide range of complex compounds having from 80 to 1200 carbon atoms, with predominating molecular weights, as determined by solution techniques, in the 1200 to 16,900 range. About 80-90% of the metals in the crude oil are contained in the asphaltene fraction which, together with a higher concentration of non-metallic heteroatoms, render asphaltene molecules more hydrophilic and less hydrophobic than other hydrocarbons in heavy oil resids.

Figure 4:
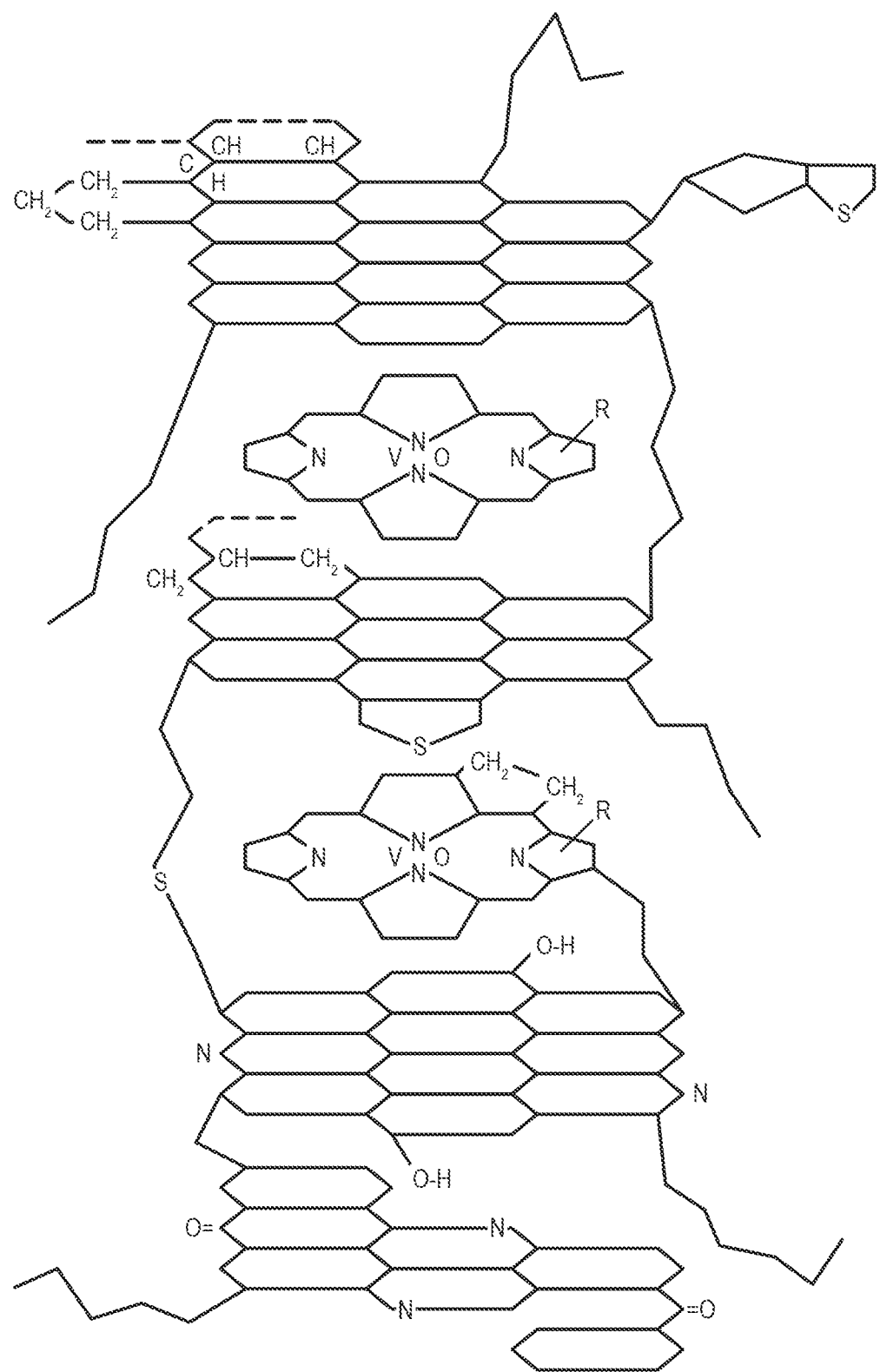
FIG. 4 depicts a hypothetical molecular structure of asphaltene.

A hypothetical asphaltene molecule structure developed by A.G. Bridge and co-workers at Chevron is depicted in FIG. 4. Asphaltenes are typically defined based on the results of insolubles analyses, and more than one definition of asphaltenes may be used. Specifically, a commonly used definition of asphaltenes is heptane insolubles minus toluene insolubles (i.e., asphaltenes are soluble in toluene; sediments and residues insoluble in toluene are not counted as asphaltenes). Asphaltenes defined in this fashion may be referred to as "$C_7$ asphaltenes". Another definition is measured as pentane insolubles minus toluene insolubles, and commonly referred to as "$C_5$ asphaltenes". In the examples of the present invention, the $C_7$ asphaltene definition is used, but the $C_5$ asphaltene definition can be readily substituted.

The term "sediment" refers to solids formed in a liquid stream that can settle out within equipment of a heavy oil hydroprocessing system. Sediments can include inorganics, coke, or insoluble asphaltenes which precipitate after conversion. Sediment in petroleum products is commonly measured using the IP-375 hot filtration test procedure for total sediment in residual fuel oils published as part of ISO 10307 and ASTM D4870. Other tests include the IP-390 sediment test and the Shell hot filtration test. Sediment is related to components of the oil that have a propensity for forming solids during processing and handling. These solid-forming components have multiple undesirable effects in a hydroconversion process, including degradation of product quality (e.g., bottoms quality) and operability problems related to equipment fouling. It should be noted that although the strict definition of sediment is based on the measurement of solids in a sediment test, the term is commonly used more loosely to refer to the solids-forming components of the oil itself, which may not be present in the oil as actual solids but which contribute to solids formation under certain conditions.

All crudes have a vacuum resid component with a characteristic "sediment forming tendency". Although the sediment forming tendency of a heavy oil feedstock is not always quantifiable, some heavy oil feedstocks have lesser or greater sediment forming tendencies, For example, Russian crude oils such as Ural, South American crude oils such as Venezuelan and Colombian, and some Central or North American crude oils such as Mexican, and certain Gulf of Mexico crudes, have vacuum resid components with significantly higher sediment forming tendency compared to ordinary crudes, such as West Texas Intermediate crude oil, Alaska North Slope crude oil, many African crude oils, North Sea crude oils, and most Middle Eastern crude oils, including Arabian Medium Crude, Arabian Heavy Crude, and Bonny Light Crude.

The term "fouling" refers to the formation of an undesirable phase (foulant) that interferes with processing. The foulant is normally a carbonaceous material or solid that deposits and collects within the processing equipment. Equipment fouling can result in loss of production due to equipment shutdown, decreased performance of equipment, increased energy consumption due to the insulating effect of foulant deposits in heat exchangers or heaters, increased maintenance costs for equipment cleaning, reduced efficiency of fractionators, and reduced reactivity of the heterogeneous catalyst.

The "rate of equipment fouling" of a hydrocracking reactor can be determined by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnarounds.

The terms "heavy oil" and "heavy oil feedstock" refer to heavy crude, oil sands bitumen, bottom of the barrel and residuum left over from refinery processes, such as visbreaker bottoms, and any other lower quality materials that contain a substantial quantity of high boiling hydrocarbon fractions and/or that include a significant quantity of asphaltenes that can deactivate a heterogeneous catalyst and/or cause or result in formation of coke precursors and sediment. Examples of heavy oils include, but are not limited to, Lloydminster heavy oil, Cold Lake bitumen, Athabasca bitumen, atmospheric tower bottoms, vacuum tower bottoms, residuum (or "resid"), resid pitch, vacuum residue (e.g., Ural VR, Arab Medium VR, Athabasca VR, Cold Lake VR, Maya VR, and Chichimene VR), deasphalted liquids obtained by solvent deasphalting, asphaltene liquids obtained as a byproduct of deasphalting, and non-volatile liquid fractions that remain after subjecting crude oil, bitumen from tar sands, liquefied coal, oil shale, or coal tar feedstocks to distillation, hot separation, solvent extraction, and the like. By way of further example, atmospheric tower bottoms (ATB) can have a nominal boiling point of at least 343° C. (650° F.) although it is understood that the cut point can vary among refineries and be as high as 380° C. (716° F.). Vacuum tower bottoms can have a nominal boiling point of at least 524° C. (975° F.), although it is understood that the cut point can vary among refineries and be as high as 538° C. (1000° F.) or even 565° C. (1050° F.).

The "quality" of heavy oil can be measured by at least one characteristic selected from, but not limited to: (i) boiling point; (ii) concentration of sulfur; (iii) concentration of nitrogen; (iv) concentration of metals; (v) molecular weight; (vi) viscosity, (vii) hydrogen to carbon ratio; (viii) asphaltene content; and (ix) sediment forming tendency.

A "lower quality heavy oil" and/or "lower quality feedstock blend" can have at least one lower quality characteristic compared to an initial heavy oil feedstock selected from, but not limited to: (i) higher boiling point; (ii) higher concentration of sulfur; (iii) higher concentration of nitrogen; (iv) higher concentration of metals; (v) higher molecular weight (often indicated by higher density and viscosity); (vi) higher viscosity, (vii) lower hydrogen to carbon ratio; (viii) higher asphaltene content; and (ix) greater sediment forming tendency.

The term "opportunity feedstock" refers to lower quality heavy oils and lower quality heavy oil feedstock blends having at least one lower quality characteristic compared to an initial heavy oil feedstock. An opportunity feedstock typically has a lower market value (or price) compared to an initial feedstock.

The terms "deasphalted oil", "DAO" and "deasphalted oil feedstock" refer to a hydrocarbon material, including a resid material produced from heavy oil in one or more hydroprocessing reactors and one or more separators, that has been subjected to solvent deasphalting to remove asphaltenes, metals, sediment, and other insolubles by solvent extraction. The deasphalted oil is the soluble portion that is removed in the solvent, while pitch is the material that is insoluble in the solvent. Different solvents can be employed for a desired "lift" of DAO from the resid material being processed. Lighter solvents (e.g., $C_3$ and $C_4$) achieve lower lift and reject a substantial amount of aromatic compounds and resins while heaver solvents (e.g., $C_5$-$C_7$) extract more of the aromatic compounds and resins and therefore achieve higher lift.

The terms "hydrocracking" and "hydroconversion" refer to processes whose primary purpose is to reduce the boiling range of heavy oil and in which a substantial portion of the heavy oil is converted into products with boiling ranges lower than that of the original feed. Hydrocracking or hydroconversion generally involves fragmentation of larger hydrocarbon molecules into smaller molecular fragments having a smaller number of carbon atoms and a higher hydrogen-to-carbon ratio. The mechanism by which hydrocracking occurs typically involves the formation of hydrocarbon free radicals during thermal fragmentation, followed by capping of free radicals with hydrogen. The hydrogen atoms or radicals that react with hydrocarbon free radicals during hydrocracking can be generated at or by active catalyst sites.

The term "hydrotreating" refers to processes whose primary purpose is to remove impurities such as sulfur, nitrogen, oxygen, halides, and trace metals from the feedstock and saturate olefins and/or stabilize hydrocarbon free radicals by reacting them with hydrogen rather than allowing them to react with themselves. The primary purpose is not to change the boiling range of the feedstock. Hydrotreating is most often carried out using a fixed bed reactor, although other hydroprocessing reactors can be used, examples of which are an ebullated bed hydrotreater and slurry phase hydrotreater.

Of course, "hydrocracking" and "hydroconversion" may also involve the removal of sulfur and nitrogen from a feedstock as well as olefin saturation and other reactions typically associated with "hydrotreating". The terms "hydroprocessing" and "hydroconversion" shall broadly refer to both "hydrocracking" and "hydrotreating" processes, which define opposite ends of a spectrum, and everything in between along the spectrum.

The term "hydrocracking reactor" refers to any vessel in which hydrocracking (i.e., reducing the boiling range) of a feedstock in the presence of hydrogen and a hydrocracking catalyst is the primary purpose. Hydrocracking reactors are characterized as having one or more inlet ports into which heavy oil and hydrogen are introduced, an outlet port from which an upgraded feedstock or material is withdrawn, and sufficient thermal energy that promotes fragmentation of larger hydrocarbon molecules into smaller molecules, causing formation of hydrocarbon free radicals. Examples of hydrocracking reactors include, but are not limited to, slurry phase reactors (i.e., two-phase, gas-liquid system), ebullated bed reactors (i.e., three-phase, gas-liquid-solid system), and fixed bed reactors (i.e., three-phase system that includes a liquid feed trickling downward over or flowing upward through a fixed bed of solid heterogeneous catalyst with hydrogen typically flowing co-currently with, but possibly counter-currently, to the heavy oil).

The term "hydrocracking temperature" refers to a minimum temperature required to cause significant hydrocracking of a heavy oil feedstock. In general, hydrocracking temperatures will preferably fall within a range of about 399° C. (750° F.) to about 460° C. (860° F.), more preferably in a range of about 418° C. (785° F.) to about 443° C. (830° F.), and most preferably in a range of about 421° C. (790° F.) to about 440° C. (825° F.).

The term "gas-liquid slurry phase hydrocracking reactor" refers to a hydroprocessing reactor that includes a continuous liquid phase and a gaseous dispersed phase, which forms a "slurry" of gaseous bubbles within the liquid phase. The liquid phase typically comprises a hydrocarbon feedstock that may contain a low concentration of dispersed metal sulfide catalyst particles, which can behave colloidally or as a pseudo solute, and the gaseous phase typically comprises hydrogen gas, hydrogen sulfide, and vaporized low boiling point hydrocarbon products. The liquid phase can optionally include a hydrogen donor solvent.

The term "gas-liquid-solid, 3-phase slurry hydrocracking reactor" is used when a solid catalyst is employed along with liquid and gas. The gas may contain hydrogen, hydrogen sulfide, and vaporized low boiling hydrocarbon products. The term "slurry phase reactor" shall broadly refer to both type of reactors (e.g., those with dispersed metal sulfide catalyst particles, those with a micron-sized or larger particulate catalyst, and those that include both).

The terms "solid heterogeneous catalyst", "heterogeneous catalyst" and "supported catalyst" refer to catalysts typically used in ebullated bed and fixed bed hydroprocessing systems, including catalysts designed primarily for hydrocracking, hydroconversion, hydrodemetallization, and/or hydrotreating. A heterogeneous catalyst typically comprises a catalyst support structure having a large surface area and interconnected channels or pores and fine active catalyst particles, such as sulfides of cobalt, nickel, tungsten, and/or molybdenum, dispersed within the channels or pores. The pores of the support are typically of limited size to maintain mechanical integrity of the heterogeneous catalyst and prevent breakdown and formation of excessive fines in the reactor. Heterogeneous catalysts can be produced as cylindrical pellets, cylindrical extrudates, other shapes such as trilobes, rings, saddles, or the like, or spherical solids.

The terms "dispersed metal sulfide catalyst particles" and "dispersed catalyst" refer to catalyst particles having a particle size below 1 (submicron, or sub micrometer), preferably less than about 500 nm, or less than about 250 nm, or less than about 100 nm, or less than about 50 nm, or less than about 25 nm, or less than about 10 nm, or less than about 5 nm. The term "dispersed metal sulfide catalyst particles" may include molecular or molecularly-dispersed catalyst compounds. The term "dispersed metal sulfide catalyst particles" typically excludes metal sulfide particles and agglomerates of metal sulfide particles that are larger than 1 µm.

The term "molecularly-dispersed catalyst" refers to catalyst compounds that are essentially "dissolved" or dissociated from other catalyst compounds or molecules in a hydrocarbon feedstock or suitable diluent. It can include very small catalyst particles that contain a few catalyst molecules joined together (e.g., 15 molecules or less).

The terms "residual dispersed catalyst particles" and "residual dispersed metal sulfide catalyst particles" refer to catalyst particles that remain with a hydrocarbon product when transferred from one vessel to another (e.g., from a hydroprocessing reactor to a separator and/or other hydroprocessing reactor). Residual dispersed metal sulfide catalyst particles may also remain in a liquid residual fraction or pitch after separation of a hydrocarbon product into distillates and residual liquid or pitch, such as by flash separation, hot separation, atmospheric distillation, vacuum distillation, or vacuum stripping.

The term "conditioned feedstock" refers to a hydrocarbon feedstock into which a catalyst precursor has been combined and mixed sufficiently so that, upon decomposition of the catalyst precursor and formation of the active catalyst, the catalyst will comprise dispersed metal sulfide catalyst particles formed in situ within the feedstock. Conditioned feedstocks include conditioned heavy oil and conditioned deasphalted oil.

The terms "upgrade", "upgrading" and "upgraded", when used to describe a feedstock that is being or has been subjected to hydroprocessing, or a resulting material or product, refer to one or more of a reduction in molecular weight of the feedstock, a reduction in boiling point range of the feedstock, a reduction in concentration of asphaltenes, a reduction in concentration of hydrocarbon free radicals, and/or a reduction in quantity of impurities, such as sulfur, nitrogen, oxygen, halides, and metals.

The term "severity" refers to the amount of energy that is introduced into heavy oil during hydroprocessing and is related to the operating temperature of the hydroprocessing reactor (i.e., higher temperature is related to higher severity and lower temperature is related to lower severity at same or similar throughput) in combination with duration or residence time. Increased severity generally increases the quantity of converted products produced by the hydroprocessing reactor, including both desirable products and undesirable products. Conversion and throughput also affect severity. For example, when temperature is increased and throughput is held constant, conversion typically increases for a given feedstock. In order to maintain temperature while increasing throughput (i.e., increasing the liquid hourly space velocity), which decreases residence time of the heavy oil in the reactor, more heat energy must be added to the system to offset the cooling effect of passing a greater quantity per unit time of initially cooler heavy oil into the reactor.

Desirable conversion products include hydrocarbons of reduced molecular weight, boiling point, and specific gravity, which can include end products such as naphtha, diesel, jet fuel, kerosene, wax, fuel oil, and the like. Other desirable conversion products include higher boiling hydrocarbons that can be further processed using conventional refining and/or distillation processes. Bottoms products of sufficient quality to be useful as fuel oil are other examples of desirable conversion products.

Undesirable conversion products include coke, sediment, metals, and other solid materials that can deposit on hydroprocessing equipment and cause fouling, such as interior components of reactors, separators, filters, pipes, towers, heat exchangers, and the heterogeneous catalyst. Undesirable conversion products can also refer to unconverted resid that remains after distillation, such as atmospheric tower bottoms ("ATB") or vacuum tower bottoms ("VTB"), particularly which are of too low of quality to be useful as fuel oil or other desired use. Minimizing undesirable conversion products reduces equipment fouling and shutdowns required to clean the equipment. Nevertheless, there may be a desirable quantity of unconverted resid in order for downstream separation equipment to function properly and/or to provide a liquid transport medium for carrying coke, sediment, metals, and other solid materials that might otherwise deposit on and foul equipment but that can be transported away by the remaining resid.

In addition to temperature, "severity" can be related to one or both of "conversion" and "throughput". Whether increased severity involves increased conversion and/or increased or decreased throughput may depend on the quality of the heavy oil feedstock and/or the mass balance of the overall hydroprocessing system. For example, where it is desired to convert a greater quantity of feed material and/or provide a greater quantity of material to downstream equipment, increased severity may primarily involve increased throughput without necessarily increasing fractional conversion. This can include the case where resid fractions (ATB and/or VTB) are sold as fuel oil, and increased conversion without increased throughput might decrease the quantity of this product. In the case where it is desired to increase the ratio of upgraded materials to resid fractions, it may be desirable to primarily increase conversion without necessarily increasing throughput. Where the quality of heavy oil introduced into the hydroprocessing reactor fluctuates, it may be desirable to selectively increase or decrease one or both of conversion and throughput to maintain a desired ratio of upgraded materials to resid fractions and/or a desired absolute quantity or quantities of end product(s) being produced.

The terms "conversion" and "fractional conversion" refer to the proportion, often expressed as a percentage, of heavy oil that is converted into lower boiling and/or lower molecular weight materials. Conversion is expressed as a percentage of the initial resid content (i.e., components with boiling points greater than a defined residue cut point) that is converted to products with boiling points less than the defined cut point. The definition of residue cut point can vary and can nominally include 524° C. (975° F.), 538° C. (1000° F.), 565° C. (1050° F.), and the like. It can be measured by distillation analysis of feed and product streams to determine the concentration of components with boiling point greater than the defined cut point. Fractional conversion is expressed as $(F-P)/F$, where F is the quantity of resid in the combined feed streams and P is the quantity in the combined product streams, where both feed and product resid content are based on the same cut point definition. The quantity of resid is most often defined based on the mass of components with boiling point greater than the defined cut point, but volumetric or molar definitions can also be used.

The conversion of asphaltenes can be different than the overall conversion of heavy oil. For purposes of this disclosure, a useful definition of asphaltene conversion is based on the relative amounts of asphaltenes in the fresh feedstock and upgraded product, and can be defined by the following, which results in a decimal fraction between 0 and 1, which can be converted into a percentage by multiplying by 100:

$$\text{Conv}=[\text{Asph (fresh feed)}-\text{Asph (products)}]/\text{Asph (fresh feed)}.$$

The asphaltene content of a recycle stream is internal to the process. When conversion of asphaltenes is too low compared to conversion of heavy oil as a whole, recycle buildup of asphaltenes can occur.

The term "throughput" refers to the quantity (mass or volume) of feed material introduced into the hydroprocessing reactor per unit of time. Throughput can be expressed in volumetric terms, such as barrels per hour or per day, or in mass terms, such as metric tons per hour or per day. In common usage, throughput is defined as the mass or volumetric feed rate of only the heavy oil feedstock itself (for example, vacuum tower bottoms or the like). The definition normally excludes the quantity of diluents or other components that can be added to or included in the overall feeds to a hydroconversion unit, although a definition which includes those other components can also be used.

The terms "space velocity" and "liquid hourly space velocity" are related to the throughput of a particular reactor or reactor size but are normalized to remove the size (volume) of the reactor. Thus, a larger reactor can have twice the throughput but the same space velocity as a reactor with half the volume size. Therefore, an increase in space velocity is typically proportional to an increase in throughput for a given reactor size. Space velocity is inversely proportional to residence time of heavy oil in a reactor of given reactor size.

The "production rate of converted products" is an absolute rate that can be expressed in volumetric terms, such as barrels per or hour or per day, or in mass terms, such as metric tons per hour or per day. The "production rate of converted products" should not be confused with yield or efficiency, which are sometimes erroneously called "rate"

(e.g., production rate per unit feed rate, or production rate per unit converted feed). It will be appreciated that the actual numeric values of both initial production rate of converted products and increased production rate of converted products are specific to an individual production facility and depend on the capacity of that facility. Therefore, it is valid to compare the production rate of the unit or facility in question before and after modification but not against a different unit or facility built with a different capacity.

II. Hydroprocessing and Deasphalting Systems

Figure 1:
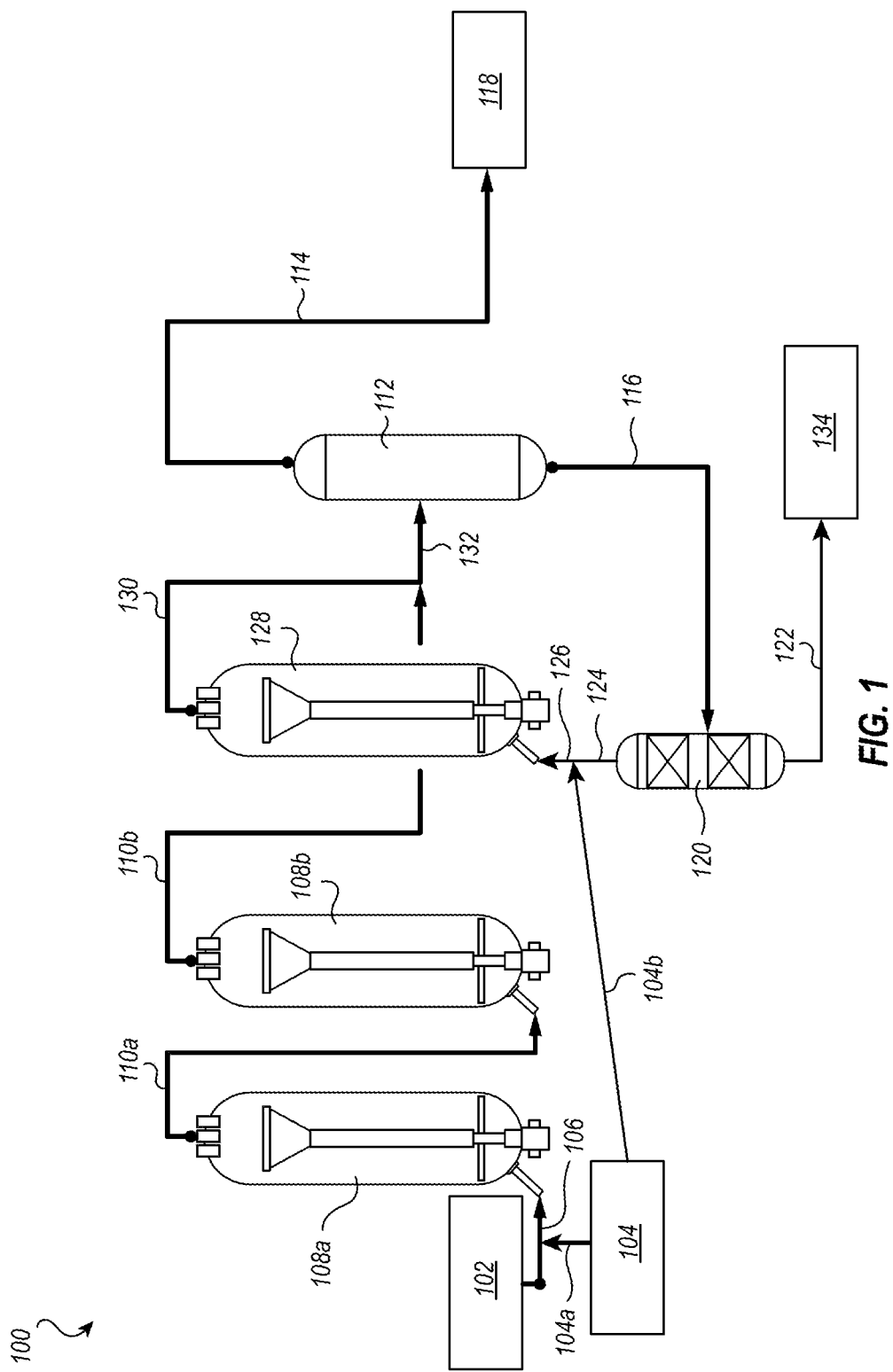
FIG. 1 schematically illustrates a combined hydroprocessing and solvent deasphalting system for processing heavy oil feedstocks.

FIG. 1 schematically illustrates an embodiment of a combined hydroprocessing and deasphalting system 100 for efficient upgrading of heavy oil. The system 100 includes subsystems for hydroprocessing heavy oil, deasphalting a resid portion of converted products from hydroprocessing heavy oil to produce deasphalted oil, and hydroprocessing the deasphalted oil.

The subsystem for hydroprocessing heavy oil is configured to hydroprocess a heavy oil feedstock 102 into which is added a first portion 104a of a catalyst precursor 104 to form a conditioned feedstock 106 which, when heated to above its decomposition temperature, decomposes to liberate catalyst metal. The catalyst metal reacts with sulfur (e.g., hydrogen sulfide gas and/or organo-sulfur compounds in the heavy oil feedstock 102) to form a first quantity of dispersed metal sulfide catalyst particles in situ within the heavy oil feedstock 102. The conditioned feedstock can be preheated prior to being fed into a first hydroprocessing reactor 108a to form the dispersed metal sulfide catalyst particles, or it can be fed directly into the hydroprocessing reactor 108a where it is raised to the hydroprocessing (e.g., hydrocracking) temperature, which is higher than the decomposition temperature of the catalyst precursor. The dispersed metal sulfide catalyst particles are formed by thermal deposition and reaction with sulfur in either case.

The first and second hydroprocessing reactors 108a, 108b can be any hydroprocessing reactors known in the art. In a preferred embodiment, first and second reactors 108a, 108b are ebullated bed reactors that include features common to ebullated bed hydroprocessing reactors known in the art of heavy oil upgrading. Non-limiting examples include H-Oil and LC Fining systems. Hydrogen gas (not shown) is introduced under pressure into the reactors 108a, 108b using known means. A heterogeneous ebullated bed catalyst known in the art can be used as the solid supported catalyst which, together with the dispersed metal sulfide catalyst particles, provide two forms of hydroprocessing catalyst (i.e., a dual catalyst system). The heavy oil feedstock containing catalyst precursor and/or in situ formed dispersed metal sulfide catalyst particles is typically fed continuously into the first hydroprocessing reactor 108a. The first and second hydroprocessing reactors 108a, 108b are operated at desired hydroprocessing conditions, including desired reactor severity based on temperature, conversion, and throughput.

A first stream of upgraded heavy oil 110a containing converted products, dispersed metal sulfide catalyst particles, and hydrogen is removed from the first reactor 108a and fed into a second hydroprocessing (e.g., ebullated bed) reactor 108b, which can operate similarly to the first (e.g., ebullated bed) reactor 108a. Because the ebullated bed catalyst remains in the first ebullated bed reactor 108a and is not carried with the upgraded heavy oil 110a to the second ebullated bed reactor 108b, the second ebullated bed reactor 108b will include a separate quantity of ebullated bed catalyst. However, because the dispersed metal sulfide catalyst particles from the first reactor 108b are removed and carried in the upgraded heavy oil 110a fed to the second reactor 108b, it will typically be unnecessary to add additional catalyst precursor to form an additional quantity dispersed metal sulfide catalyst particles for use in the second reactor 108b (although this may be done if desired). An additional quantity of make-up hydrogen gas can be fed to the second reactor 108b to at least partially compensate for hydrogen consumed in the first reactor 108a.

A second stream of upgraded heavy oil 110b containing further converted products, dispersed metal sulfide catalyst particles, and hydrogen is removed from the second hydroprocessing reactor 108b and fed into a separator 112, a non-limiting example of which is a hot separator. A gaseous stream 114 of vaporized hydrocarbons and gas is removed from the top of the separator 112, and a liquid stream 116 of hydrocarbons containing unconverted products is removed from the bottom of the separator 112. The stream 114 of volatile hydrocarbons and gas can be further processed downstream into products 118.

The liquid stream 116 of hydrocarbons containing unconverted products and residual dispersed metal sulfide catalyst particles is fed into a deasphalting system 120, which is schematically illustrated as a single vessel for simplicity, but in reality, typically includes several vessels, separators, and flow lines, as further illustrated below in FIG. 5. A deasphalting solvent (not shown) is introduced into the deasphalting system 120 to separate soluble hydrocarbons from insoluble materials, such as asphaltenes, metals, and other insolubles, which are removed as a stream 122 of pitch, which can be discarded, recycled as part of the heavy oil feedstock used in the heavy oil hydroprocessing subsystem, such as to provide an additional quantity of dispersed metal sulfide catalyst particles, and/or further processed into products 134.

A stream 124 of deasphalted oil from the deasphalting system 120 is fed into a hydroprocessing reactor 128 configured to hydroprocess deasphalted oil. The deasphalted oil will typically contain a substantially depleted quantity of dispersed metal sulfide catalyst particles to the extent that the deasphalting system 120 has removed a substantial portion of residual dispersed metal sulfide catalyst particles in the hydrocarbon stream 116. Therefore, a second portion 104b of the catalyst precursor 104 is advantageously added to the deasphalted oil 124 prior to being introduced into the hydroprocessing reactor 128 to form a second quantity of dispersed metal sulfide catalyst particles within a stream of conditioned deasphalted oil 126.

The hydroprocessing reactor 128 may be similar to or different than reactors 108a, 108b for hydroprocessing heavy oil. In some embodiments, reactor 128 can be an ebullated bed reactor that utilizes a heterogeneous catalyst in combination with dispersed metal sulfide catalyst particles. Because deasphalted oil contains a substantially reduced quantity of asphaltenes, metals, and other foulants, the hydroprocessing reactor 128 may be configured to operate at significantly higher severity (e.g., one or more of higher temperature, conversion, and/or throughput) to increase or maximize efficiency. The substantial reduction in asphaltenes in the deasphalted oil may also permit the use of less catalyst precursor and lower amount of dispersed metal sulfide catalyst particles compared to the amount of dispersed metal sulfide catalyst particles in the reactors 108a, 108b for hydroprocessing heavy oil.

The concentration of dispersed metal sulfide catalyst particles used in the reactors 108a, 108b for hydroprocessing heavy oil is determined by the amount of the first quantity 104a of catalyst precursor 104 added to the heavy oil feedstock 102, which may be augmented in some cases with supplemental dispersed metal sulfide catalyst particles by optionally recycling a portion of the pitch 122 produced by the deasphalting system 120 back into the heavy oil feedstock 102 and/or one or both of reactors 108a, 108b.

The concentration of dispersed metal sulfide catalyst particles used in the reactor 128 for hydroprocessing deasphalted oil is determined by the amount of the second quantity 104b of catalyst precursor 104 added to the deasphalted oil 124, which may contain residual supplemental dispersed metal sulfide catalyst particles that remain in the deasphalted oil 124 rather than being removed in the pitch 122., In some embodiments, the concentration of dispersed metal sulfide catalyst particles used in the reactor for hydroprocessing deasphalted oil can be in a range of about 2% to about 80%, or about 3% to about 60%, or about 4% to about 50%, or about 5% to about 40%, or about 6% to about 30%, of the concentration dispersed metal sulfide catalyst particles used in the reactor for hydroprocessing heavy oil.

Figure 2:
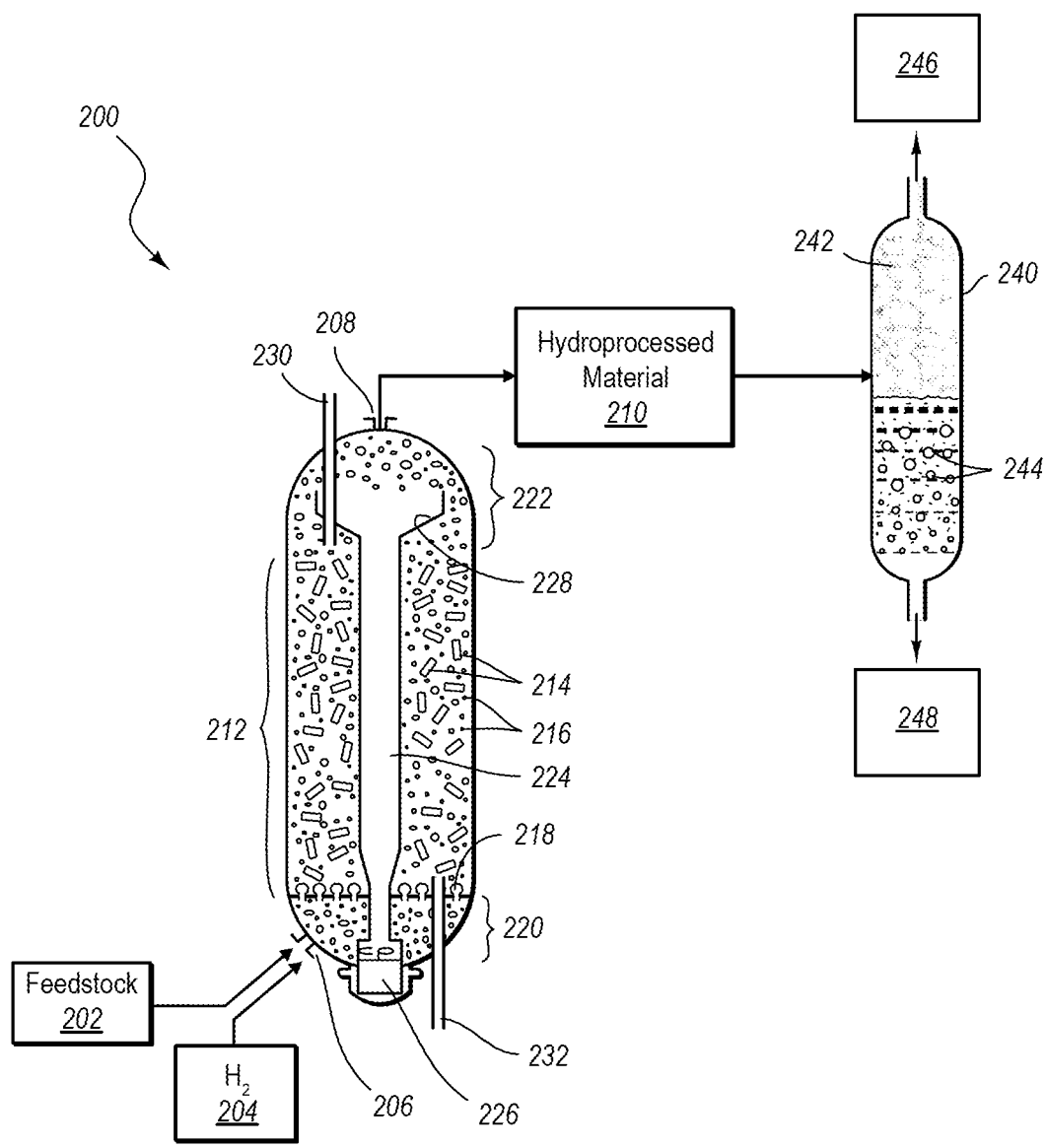
FIG. 2 schematically illustrates an ebullated bed reactor and a separator unit that separates volatile materials from non-volatile materials, which can be used to hydroprocess heavy oil or deasphalted oil.
Figure 3:
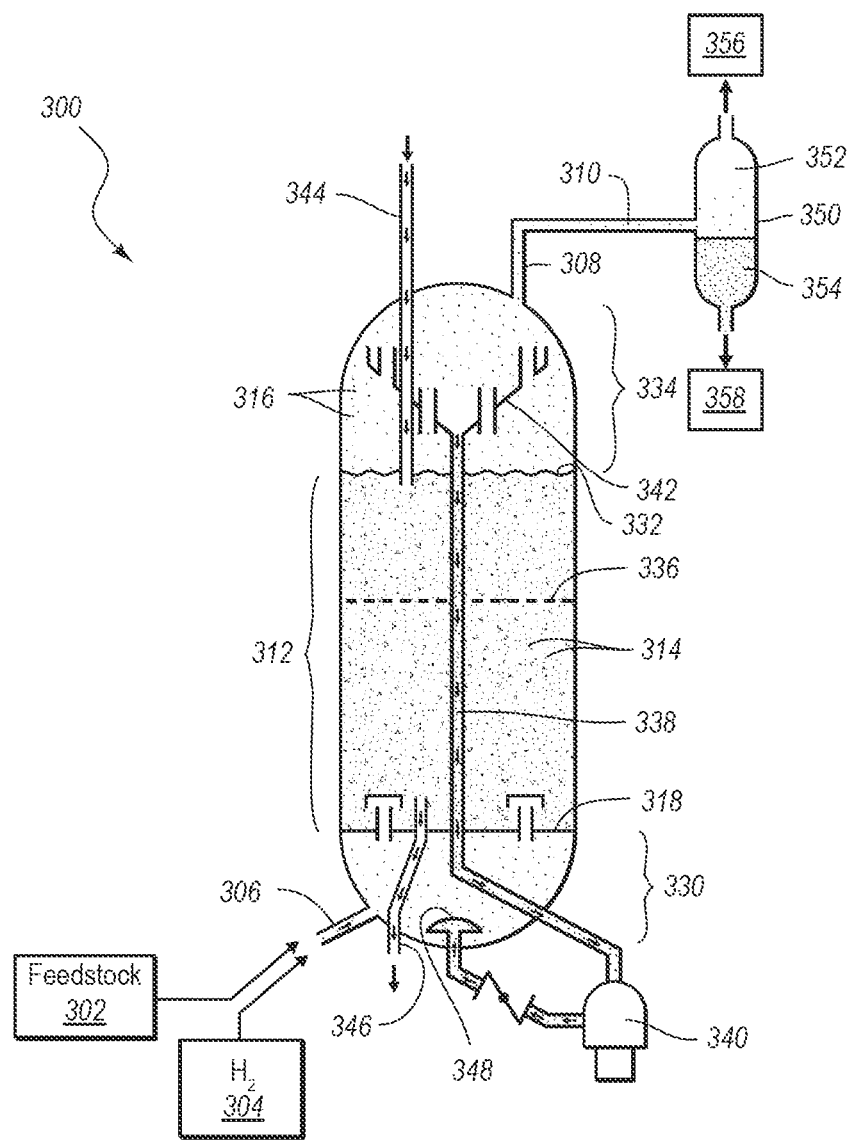
FIG. 3 schematically illustrates an ebullated bed reactor and a separator unit that separates volatile materials from non-volatile materials, which can be used to hydroprocess heavy oil or deasphalted oil.

FIGS. 2 and 3 schematically illustrate ebullated bed hydroprocessing reactors 200, 300 that can be used to hydroprocess heavy oil and deasphalted oil within the combined methods and systems for hydroprocessing and deasphalting heavy oil disclosed herein. Each of the ebullated bed hydroprocessing reactors 200, 300 can be operated at desired hydroprocessing conditions, including desired reactor severity based on temperature, conversion, and throughput, based on the type and quality of heavy oil or deasphalted oil being hydroprocessed as well as the desired rate of production of converted products.

The feedstocks that are hydroprocessed may comprise any desired fossil fuel feedstock and/or fraction thereof including, but not limited to, one or more of heavy crude, oil sands bitumen, bottom of the barrel fractions from crude oil, atmospheric tower bottoms, vacuum tower bottoms, coal tar, liquefied coal, other resid fractions, and deasphalted oil. Heavy oils and resids can include a significant fraction of high boiling point hydrocarbons (i.e., nominally at or above 343° C. (650° F.), more particularly nominally at or above about 524° C. (975° F.)) and/or asphaltenes. Asphaltenes are complex hydrocarbon molecules that include a relatively low ratio of hydrogen to carbon that is the result of a substantial number of condensed aromatic and naphthenic rings with paraffinic side chains (See FIG. 4). Sheets consisting of the condensed aromatic and naphthenic rings are held together by heteroatoms such as sulfur or nitrogen and/or polymethylene bridges, thio-ether bonds, and vanadium and nickel complexes. The asphaltene fraction also contains a higher content of sulfur and nitrogen than does crude oil or the rest of the vacuum resid, and it also contains higher concentrations of carbon-forming compounds (i.e., that form coke precursors and sediment).

FIG. 2 schematically illustrates an ebullated bed hydroprocessing reactor 200 used in the LC-Fining hydrocracking system developed by C-E Lummus. Ebullated bed reactor 200 includes an inlet port 206 near the bottom through which a feedstock 202 and pressurized hydrogen gas 204 are introduced, and an outlet port 208 at the top, through which hydroprocessed material 210 is withdrawn.

The ebullated bed reactor 200 further includes an expanded catalyst zone 212 comprising a heterogeneous catalyst 214 that is maintained in an expanded or fluidized state against the force of gravity by upward movement of liquid hydrocarbons and gas (schematically depicted as bubbles 216) through the ebullated bed reactor 200. The lower end of the expanded catalyst zone 212 is defined by a distributor grid plate 218, which separates the expanded catalyst zone 212 from a lower heterogeneous catalyst free zone 220 located below the distributor grid plate 218. The distributor grid plate 218 is configured to distribute hydrogen gas and hydrocarbons evenly throughout the reactor and prevent the heterogeneous catalyst 214 from falling by the force of gravity into the lower heterogeneous catalyst free zone 220. The upper end of the expanded catalyst zone 212 is the height at which the downward force of gravity equals or exceeds the uplifting force of the upwardly moving feedstock and gas through the reactor 200 as the heterogeneous catalyst 214 reaches a given level of expansion or separation. Above the expanded catalyst zone 212 is an upper heterogeneous catalyst free zone 222.

Hydrocarbons and other materials within the ebullated bed reactor 200 are continuously recirculated from the upper heterogeneous catalyst free zone 222 to the lower heterogeneous catalyst free zone 220 by means of a recycle channel 224 positioned in the center of the ebullated bed reactor 200 and connected to an ebullating pump 226 at the bottom of the reactor 200. At the top of the recycle channel 224 is a funnel-shaped recycle cup 228 through which hydrocarbons and other materials in the liquid are drawn from the upper heterogeneous catalyst free zone 222. The material drawn downward through the recycling channel 224 enters the lower catalyst free zone 220 and then passes upwardly through the distributor grid plate 218 and into the expanded catalyst zone 212, where it is blended with freshly added feedstock 202 and hydrogen gas 204 entering the ebullated bed reactor 200 through the inlet port 206. Continuously circulating blended materials upward through the ebullated bed reactor 200 advantageously maintains the heterogeneous catalyst 214 in an expanded or fluidized state within the expanded catalyst zone 212, minimizes channeling, controls reaction rates, and distributes heat released by exothermic hydrogenation reactions to maintain the reactor temperature at a safe level.

Fresh heterogeneous catalyst 214 can be periodically introduced into the ebullated bed reactor 200, such as into the expanded catalyst zone 212, through a catalyst inlet tube 230, which passes through the top of ebullated bed reactor 200 and directly into the expanded catalyst zone 212. Spent heterogeneous catalyst 214 can be periodically withdrawn from the expanded catalyst zone 212 through a catalyst withdrawal tube 232 that passes from a lower end of the expanded catalyst zone 212, through the distributor grid plate 218, and through the bottom of the reactor 200. It will be appreciated that the catalyst withdrawal tube 232 is unable to differentiate between fully spent catalyst, partially spent but active catalyst, and freshly added catalyst such that a random distribution of heterogeneous catalyst 214 is typically withdrawn from the ebullated bed reactor 200 as "spent" catalyst.

The hydroprocessed material 210 withdrawn from the outlet port 208 of the ebullated bed reactor 200 can be introduced into a separator 240 (e.g., hot separator, interstage pressure differential separator, atmospheric distillation tower, or vacuum distillation tower). The separator 240 is configured to separate one or more volatile fractions (or distillates) 242 from a non-volatile fraction (or liquid) 244. Volatilized fractions and gases 246 are removed at one location (e.g., top) of the separator 204, and a non-volatilized fraction 248 containing non-volatilized liquid hydrocarbons and solids are removed from another location (e.g., bottom) of the separator 204.

FIG. 3 schematically illustrates an ebullated bed reactor 300 used in the H-Oil hydrocracking system developed by Hydrocarbon Research Incorporated and currently licensed by Axens. The ebullated bed reactor 300 includes an inlet port 306 through which a feedstock 302 and pressurized hydrogen gas 304 are introduced, and an outlet port 308, through which upgraded hydrocarbon material 310 is withdrawn.

An expanded catalyst zone 312 comprising a heterogeneous catalyst 314 is bounded by a distributor grid plate 318, which separates the expanded catalyst zone 312 from a lower catalyst free zone 330 below the distributor grid plate 318, and an upper end 332, which defines an approximate boundary between the expanded catalyst zone 312 and an upper catalyst free zone 334. A dotted boundary line 336 schematically illustrates the approximate level of the heterogeneous catalyst 314 when not in an expanded or fluidized state.

Hydrocarbons and other materials in the ebullated bed reactor 300 are continuously recirculated by a recycling channel 338 connected to an ebullating pump 340 positioned outside of the reactor 300. Materials are drawn through a funnel-shaped recycle cup 342 from the upper catalyst free zone 334. The recycle cup 342 is spiral-shaped, which helps separate hydrogen bubbles 316 from recycled material passing down through recycle channel 338 to prevent cavitation in the ebullating pump 340. The recycled material enters the lower catalyst free zone 330, where it is blended with fresh feedstock 302 and hydrogen gas 304, and the mixture passes up through distributor grid plate 318 and into expanded catalyst zone 312. Fresh heterogeneous catalyst is introduced into the expanded catalyst zone 312 through a catalyst inlet tube 344, and spent heterogeneous catalyst is withdrawn from expanded catalyst zone 312 through a catalyst discharge tube 346.

The main difference between the H-Oil ebullated bed reactor 300 and the LC- Fining ebullated bed reactor 200 is the location of the ebullating pump. The ebullating pump 340 in the H-Oil reactor 300 is located external to the reaction chamber. The recirculating feedstock material is introduced through a recirculation port with distributor 346 at the bottom of the reactor 300. The recirculation port with distributor 346 aids in evenly distributing materials through the lower catalyst free zone 330.

The hydroprocessed material 310 withdrawn from the outlet port 308 of the ebullated bed reactor 300 can be introduced into a separator 350 (e.g., hot separator, interstage pressure differential separator, atmospheric distillation tower, or vacuum distillation tower). The separator 350 is configured to separate one or more volatile fractions (or distillates) 352 from a non-volatile fraction (or liquid) 354. Volatilized fractions and gases 356 are removed at one location (e.g., top) of the separator 350, and a non-volatilized fraction 358 containing non-volatilized liquid hydrocarbons and solids are removed from another location (e.g., bottom) of the separator 350.

Figure 5:
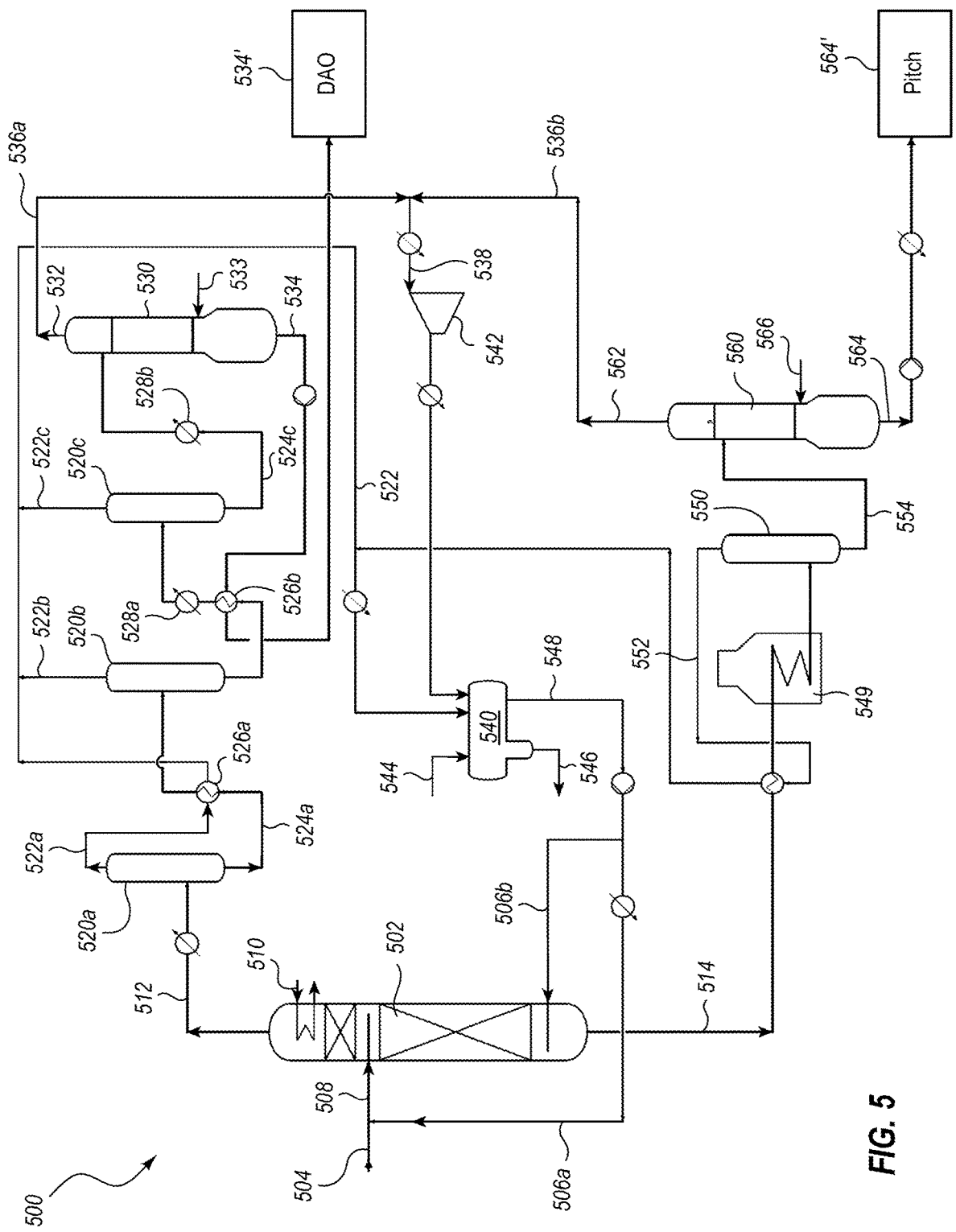
FIG. 5 schematically illustrates a deasphalting system for separating pitch from a resid material to yield deasphalted oil.

FIG. 5 schematically illustrates a deasphalting system 500 that can be used to deasphalt partially upgraded heavy oil within the combined methods and systems for hydroprocessing and deasphalting of heavy oil as disclosed herein. The deasphalting system 500 includes an extractor unit 502 configured to receive and separate soluble hydrocarbons from asphaltenes and other insoluble materials in a hydrocarbon residuum by solvent extraction.

A hydrocarbon residuum 504, such as atmospheric or vacuum tower bottoms is combined with a first extraction solvent stream 506a to form a mixed resid-solvent stream 508, which is introduced into the extractor unit 502. The hydrocarbon materials in the resid 504 that are soluble in the solvent migrate to the top of the extractor unit 502, where they are heated by steam 510 and removed as a deasphalted oil (DAO)/solvent stream 512. The insolubles, including asphaltenes, metals, at least a portion of dispersed metal sulfide catalyst particles, sediment, and other solids (collectively "pitch"), settle to the bottom of the extractor unit 502. A second solvent stream 506b is added to the bottom the extractor unit 502, where it mixes with insoluble pitch materials to form a pitch/solvent stream 514, which is removed from the bottom of the extractor unit 502. These two streams 512, 514 are further processed, as discussed below, to remove the solvent and yield a stream of deasphalted oil 534 and a stream of pitch 564.

The (DAO)/solvent stream 512 is introduced into a series of flash separators 520a, 520b, 520c, followed by a vacuum stripper 530, to remove the solvent. The (DAO)/solvent stream 512 is introduced into a first flash separator 520a, which separates a first solvent stream 522a from a first concentrated DAO/solvent stream 524a, which are passed into a first heat exchanger 526a to transfer heat from the first solvent stream 522a to the first concentrated DAO/solvent stream 524a. The first concentrated (DAO)/solvent stream 524a is introduced into a second flash separator 520b, which separates a second solvent stream 522b from a second concentrated DAO/solvent stream 524b, which are passed into a second heat exchanger 526b to transfer heat from the second solvent stream 522b to the second concentrated DAO/solvent stream 524b. The second concentrated (DAO)/solvent stream 524b is introduced into a third flash separator 520c, which separates a third solvent stream 522c from a third concentrated DAO/solvent stream 524c. The solvent streams 522a, 522b, 522c are combined into a single solvent stream 522, which is sent to a solvent drum 540.

The third concentrated DAO/solvent stream 524c is introduced into a DAO vacuum stripper 528 together with steam 530, which separates moist solvent stream 532a from deasphalted oil (DAO) 534, which can be further hydroprocessed using a hydroprocessing reactor and a dispersed metal sulfide catalyst as described herein. The moist solvent stream 532a is combined with a second moist solvent stream 532b from a pitch vacuum stripper, discussed below, to form a combined moist solvent stream 532, which is compressed by a compressor 536 and sent to the solvent drum 540.

The pitch/solvent stream 514 is passed through and heated by a heat exchanger 542, further heated by a heater 548, and introduced into a flash separator 550, which separates a solvent stream 552 from a concentrated pitch/solvent stream 554. The solvent stream 552 is passed through the heat exchanger 542 to preheat the pitch/solvent stream 514, combined with the solvent stream 522 removed from the deasphalted oil, and sent to the solvent drum 540.

The concentrated pitch/solvent stream 554 is introduced into a pitch vacuum stripper 560 together with steam 562, which separates a moist solvent stream 532b from a pitch stream 564, which can be processed, discarded, and/or used for any desired purpose, such as paving asphalt and/or recycled to a hydroprocessing reactor to provide supplemental dispersed metal sulfide catalyst particles that remain in the pitch The moist solvent stream 532b is combined with the moist solvent stream 536a from the DAO vacuum stripper 530 as discussed above.

Makeup solvent 544 is introduced into the solvent drum 540, which separates water 546 from dewatered solvent 548, which is splint into first and second solvent streams 506a, 506b and introduced into the extractor unit 502 as discussed above.

Figure 6:
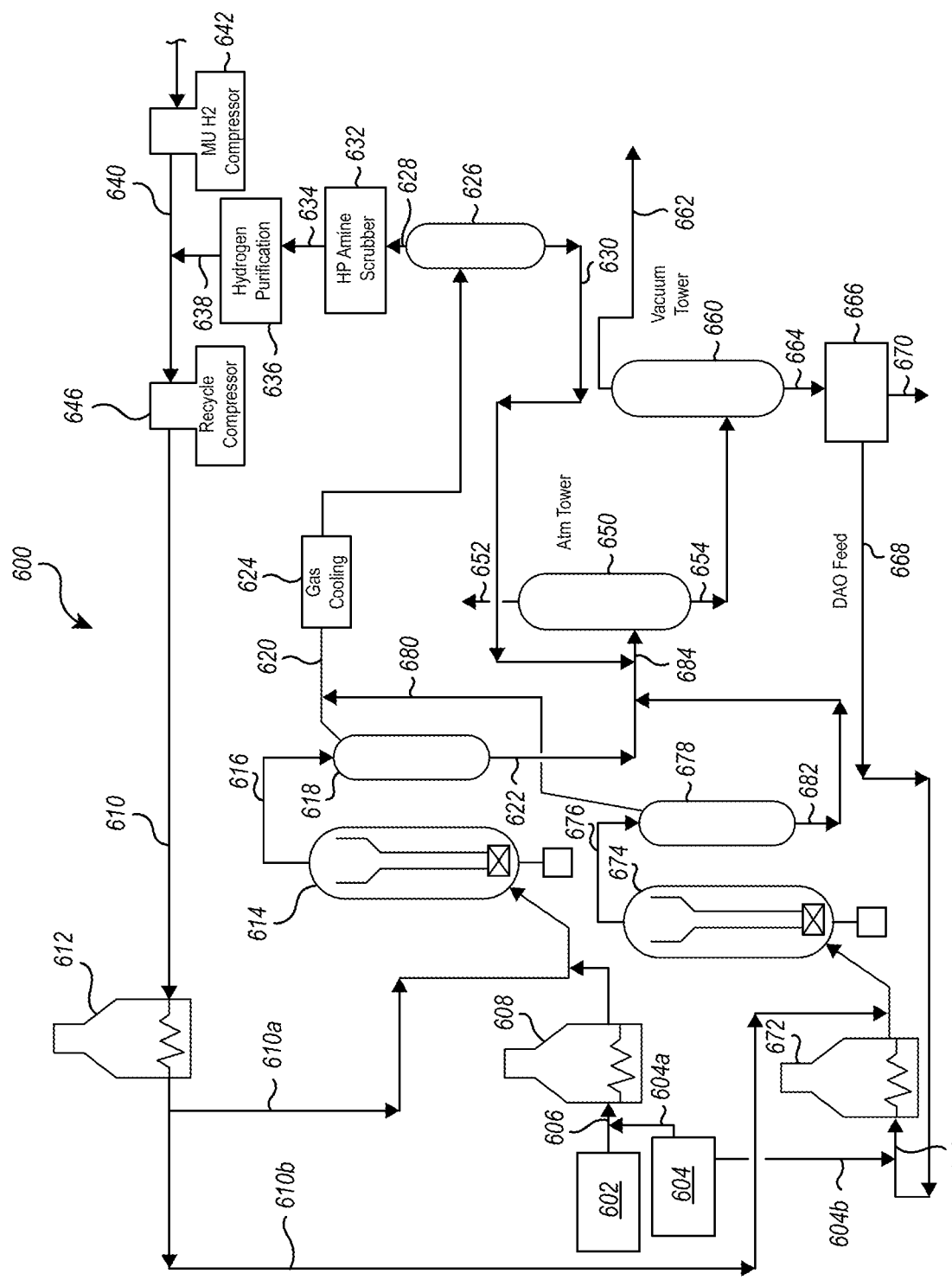
FIG. 6 schematically illustrates an exemplary combined hydroprocessing solvent and deasphalting system with sequential addition or formation of dispersed metal sulfide catalyst particles in situ.

FIG. 6 schematically illustrates a hydroprocessing and deasphalting system 600 that can be used according to the disclosed methods and systems that include sequential addition of dispersed metal sulfide catalyst for efficient hydroprocessing of heavy oil. The system 600 shows the sequential addition of dispersed metal sulfide catalyst with an SDA unit incorporated into an ebullated-bed unit according to the invention. The hydroprocessing and deasphalting system 600 includes subsystems for heavy oil hydroprocessing, solvent deasphalting, and deasphalted oil hydroprocessing and is configured to more efficiently and effectively hydroprocess and deasphalt a heavy oil feedstock 602 according to the methods and systems disclosed herein.

A catalyst precursor 604, which can be advantageously mixed with a hydrocarbon diluent to form a first diluted precursor mixture stream 604a, is combined with the heavy oil feedstock 602 using one or more mixers (not shown) to form a conditioned feedstock 606. The conditioned feedstock 606 is passed through a heater 608 to at least partially thermally decompose the catalyst precursor 604 and liberate metal, which reacts with sulfur in the heavy oil feedstock 602 and/or hydrogen sulfide gas added to the mixture, to form dispersed metal sulfide catalyst particles in situ within the heavy oil feedstock 602. The heavy oil feedstock 602 with in situ formed dispersed catalyst particles from the heater 608 is combined with a first stream 610a of heated and compressed hydrogen gas and introduced into a first ebullated bed hydroprocessing reactor 614. The first ebullated bed reactor 614 is operated at desired hydroprocessing conditions, including a desired reactor severity based on temperature, conversion, and throughput, to produce upgraded heavy oil 616.

The upgraded heavy oil 616 from the first ebullated bed reactor 614 is introduced into a first separator 618, such as a hot separator, which separates a first volatilized stream 620 of gases and hydrocarbon vapors from a first liquid hydrocarbon stream 622. The volatilized stream 620 is combined with a second volatilized stream 680 of gases and hydrocarbon vapors produced by the deasphalted oil hydroprocessing subsystem, as discussed below, and passed through a gas cooling unit 624. The cooled combined stream is introduced into a second separator 626, such as a flash separator, to remove a gas stream 628 from a second liquid hydrocarbon stream 630.

The gas stream 628 is passed through a high-pressure amine scrubber 632 to produce a partially purified gas stream 634, which is passed through a hydrogen purification unit 636 to produce purified hydrogen gas 638. The purified hydrogen gas 638 is combined with makeup hydrogen 640, which is compressed using makeup hydrogen compressor 642, to form a combined hydrogen gas stream 610, which is passed through a recycle compressor 646, through a heater 612, and split into first and second streams 610a, 610b of heated and compressed hydrogen gas. The first hydrogen stream 610a is used in the first hydroprocessing reactor 614 to hydroprocess heavy oil as discussed above. The second hydrogen stream 610b is used in a second hydroprocessing reactor 674 to hydroprocess deasphalted oil as will be discussed below.

The first liquid hydrocarbon stream 622 from the first separator 618 is combined with the second liquid hydrocarbon stream 630 from the second separator 626, and a third liquid hydrocarbon stream 682 produced by the deasphalted oil hydroprocessing subsystem, as discussed below, to form a combined liquid hydrocarbon stream 684. The combined liquid hydrocarbon stream 684 is introduced into an atmospheric distillation tower 650, which separates volatilized atmospheric gas oil 652 from atmospheric bottoms 654. The atmospheric bottoms 654 is introduced into a vacuum distillation tower 660, which separates volatilized vacuum gas oil 662 from vacuum bottoms 664.

The vacuum bottoms 664 is introduced into and processed by a solvent deasphalting system 666, such as the solvent deasphalting system 500 illustrated in FIG. 5, to produce deasphalted oil 668 and pitch 670. The deasphalted oil 668 is combined with a second diluted catalyst precursor stream 604b, passed through a heater 672, combined with the second heated and compressed hydrogen gas stream 610b, and introduced into the second hydroprocessing reactor 674.

The second ebullated bed reactor 674 is operated at desired hydroprocessing conditions, including a desired reactor severity based on temperature, conversion, and throughput, to produce upgraded deasphalted oil 676. The upgraded deasphalted oil 676 is introduced into a third separator 678, such as a hot separator, which separates the second volatilized stream 680 of gases and hydrocarbon vapors discussed above from the third liquid hydrocarbon stream 682. The second volatilized stream 680 is combined with the first volatilized stream 620 and further processed as discussed above. The third liquid hydrocarbon stream 682 is combined with the first liquid hydrocarbon stream 622 and the second liquid hydrocarbon stream 630 to form the combined liquid hydrocarbon stream 684 and further processed by atmospheric and vacuum distillation as discussed above.

Figure 7:
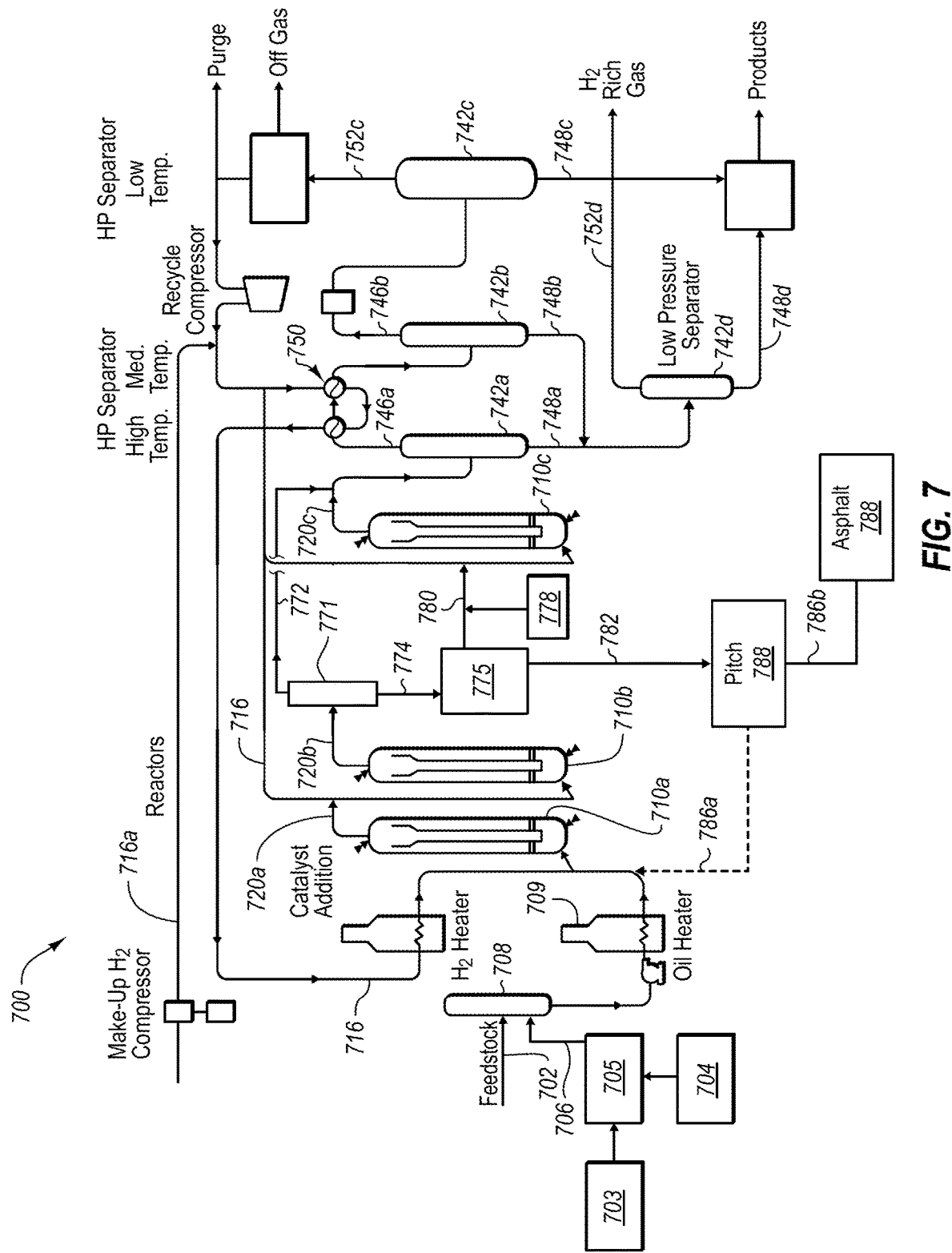
FIG. 7 schematically illustrates an exemplary ebullated bed hydroprocessing system comprising multiple ebullated bed reactors, with an interstage separator and deasphalting unit interposed between the second and third ebullated bed reactors, with optional recycling of pitch containing residual dispersed catalyst.

FIG. 7 schematically illustrates another embodiment of a combined hydroprocessing and deasphalting system 700 that can be used according to the disclosed methods and systems with sequential addition of dispersed metal sulfide catalyst particles for efficient hydroprocessing of heavy oil. The combined hydroprocessing and deasphalting system 700 includes a heavy oil hydroprocessing subsystem with multiple (e.g., one or two) ebullated bed reactors, a solvent deasphalting subsystem, and a deasphalted oil hydroprocessing subsystem with an ebullated bed reactor. The system 700 maximizes catalyst efficiency and the rate of production of converted products for any given heavy oil feedstock, including opportunity feedstocks of lower quality. The heavy oil hydroprocessing, solvent deasphalting and deasphalted oil hydroprocessing subsystems can include or be based on existing hydroprocessing and deasphalting technology.

As illustrated in FIG. 7, the combined hydroprocessing and deasphalting system 700 is configured to process a heavy oil feedstock 702. A catalyst precursor 703 is blended with a hydrocarbon diluent 704 in a mixing system 705 to product a diluted precursor mixture 706, which is added to the heavy oil feedstock 702 to form a conditioned feedstock. The mixing system 705 may include one or more mixers known in the art for blending hydrocarbon materials, such as one or more static in-line mixers and/or high shear mixers. The diluted precursor mixture 706 may be mixed with the heavy oil feedstock 702 using one or more mixers known in the art for blending hydrocarbon materials, such as one or more static in-line mixers and/or high shear mixers (not shown), to advantageously and thoroughly mix the catalyst precursor within the heavy oil 702 down to the molecular level prior to heating to decompose the catalyst precursor. A surge tank 708 can assist in mixing the diluted precursor mixture 706 and heavy oil feedstock 702, provide extended dwell time to enhance mixing, and accommodate different quantities of materials and/or flow rate fluctuations.

The conditioned heavy oil feedstock 709 from the surge tank 708 is pressurized and preheated, which causes at least partial decomposition of the catalyst precursor and formation of dispersed catalyst metal sulfide catalyst particles in situ with the heavy oil 702. Hydrogen gas 716 is pressurized, preheated, and introduced into a first ebullated bed reactor 710a along with the conditioned, pressurized, and preheated feedstock 709. The first ebullated bed reactor 710a is operated at desired hydroprocessing conditions, including desired reactor severity based on temperature, conversion, and throughput, to produce a first upgraded hydrocarbon material 720a. The first ebullated bed reactor 710a utilizes a dual catalyst system comprising dispersed catalyst metal sulfide catalyst particles and a heterogeneous ebullated bed catalyst, both of which catalyze beneficial hydroprocessing reactions in the reactor 710a.

The first upgraded hydrocarbon material 720a, which contains essentially the same concentration of dispersed catalyst metal sulfide catalyst particles used in the first ebullated bed reactor 710a, is introduced together with additional hydrogen gas 716 into a second ebullated bed reactor 710b, which is operated at desired hydroprocessing conditions, including desired reactor severity based on temperature, conversion, and throughput, to produce a second upgraded hydrocarbon material 720b. The second ebullated bed reactor 710b utilizes a dual catalyst system comprising dispersed catalyst metal sulfide catalyst particles and a heterogeneous ebullated bed catalyst, both of which catalyze beneficial hydroprocessing reactions in the reactor 710b.

The second upgraded hydrocarbon material 720b produced by the second ebullated bed reactor 710b, which contains residual dispersed catalyst metal sulfide catalyst particles, is introduced into a separator 771, such as a hot separator or an interstage pressure differential separator, which separates gases and vaporized hydrocarbons 772 from hydrocarbon bottoms 774 containing unconverted hydrocarbons and asphaltenes, metals, the residual dispersed metal sulfide catalyst particles, sediment, and other non-volatile materials.

The hydrocarbon bottoms 774 are sent to a solvent deasphalting system 776, such as the solvent deasphalting system 500 illustrated in FIG. 5, which separates deasphalted oil 780 from pitch 782. At least a portion of residual dispersed metal sulfide catalyst particles in the hydrocarbon bottoms 774 typically remain in the pitch 782 rather than the deasphalted oil 780. In some cases, essentially all of the residual dispersed metal sulfide catalyst particles remain in the pitch 782. The pitch 782 can be used for any desired purpose, including being pelletized and burned as fuel, used as a recycled pitch stream 786 to add supplemental dispersed catalyst metal sulfide catalyst particles to the heavy oil hydroprocessing subsystem, or used as asphalt 788 (e.g., for road paving).

The deasphalted oil stream 780 is mixed with an additional quantity of catalyst precursor 778, which can be provided as a diluted precursor mixture similar to mixture 706, but typically in a lower concentration that what is introduced into the first ebullated bed reactor 710a, to form a conditioned deasphalted oil in which dispersed metal sulfide catalyst particles are or will be formed in situ upon heating and thermal decomposition of the catalyst precursor. The conditioned deasphalted oil, with or without being preheated, is introduced into a third ebullated bed hydroprocessing reactor 710c together with pressurized hydrogen 716. The third reactor 710c is operated at desired hydroprocessing conditions, including a desired reactor severity based on temperature, conversion, and throughput, to produce a third upgraded hydrocarbon material 720c. The third ebullated bed reactor 710c utilizes a dual catalyst system comprising dispersed catalyst metal sulfide catalyst particles and a heterogeneous ebullated bed catalyst, both of which catalyze beneficial hydroprocessing reactions in the reactor 710c.

The third upgraded hydrocarbon material 720c produced by the third ebullated bed reactor 710c is combined with the gases and vaporized hydrocarbons 772 from the separator 771 of the heavy oil hydroprocessing subsystem and sent to a high temperature separator 742a (i.e., hot separator). The high temperature separator 742a separates gases and hydrocarbon vapors 746a from a first non-volatilized liquid hydrocarbon 748a. The volatilized materials 246a pass through a heat exchanger 750, which removes heat that is used to preheat hydrogen gas 716 before it is fed into the ebullated bed reactors 710a, 710b, 710c. The somewhat cooled volatile fraction 746a is sent to a medium temperature separator 742b, which separates a remaining volatile material 746b from a second non-volatilized liquid hydrocarbon 748b, which forms as a result of cooling by the heat exchanger 750. The remaining volatile material 746b is sent to a low temperature separator 242c for further separation into a gaseous material 752c and a first degassed liquid 748c.

The second non-volatilized liquid hydrocarbon 748b from the medium temperature separator 742b is combined with the first non-volatilized liquid hydrocarbon 748a from the high temperature separator 742a, and the combined liquid hydrocarbon stream is sent to a low-pressure separator 742d. The low-pressure separator 742d separates hydrogen rich gas 752d from a second degassed liquid 748d, which is sent along with the first degassed liquid 748c from the low temperature separator 742c to a backend system 760, which includes one or more distillation towers, including a vacuum distillation tower, where the materials are fractionated into products, including lighter hydrocarbons and distillation bottoms.

The gaseous stream 752c from the low temperature separator 742c is purified into off-gas, purge gas, and hydrogen gas 716. The hydrogen gas 716 is compressed, mixed with compressed make-up hydrogen gas 716a, and either passed through the heat exchanger 750, heated, and introduced into the first ebullated bed reactor 710a or introduced directly into the second and third ebullated bed reactors 710b and 710b.

Figure 8:
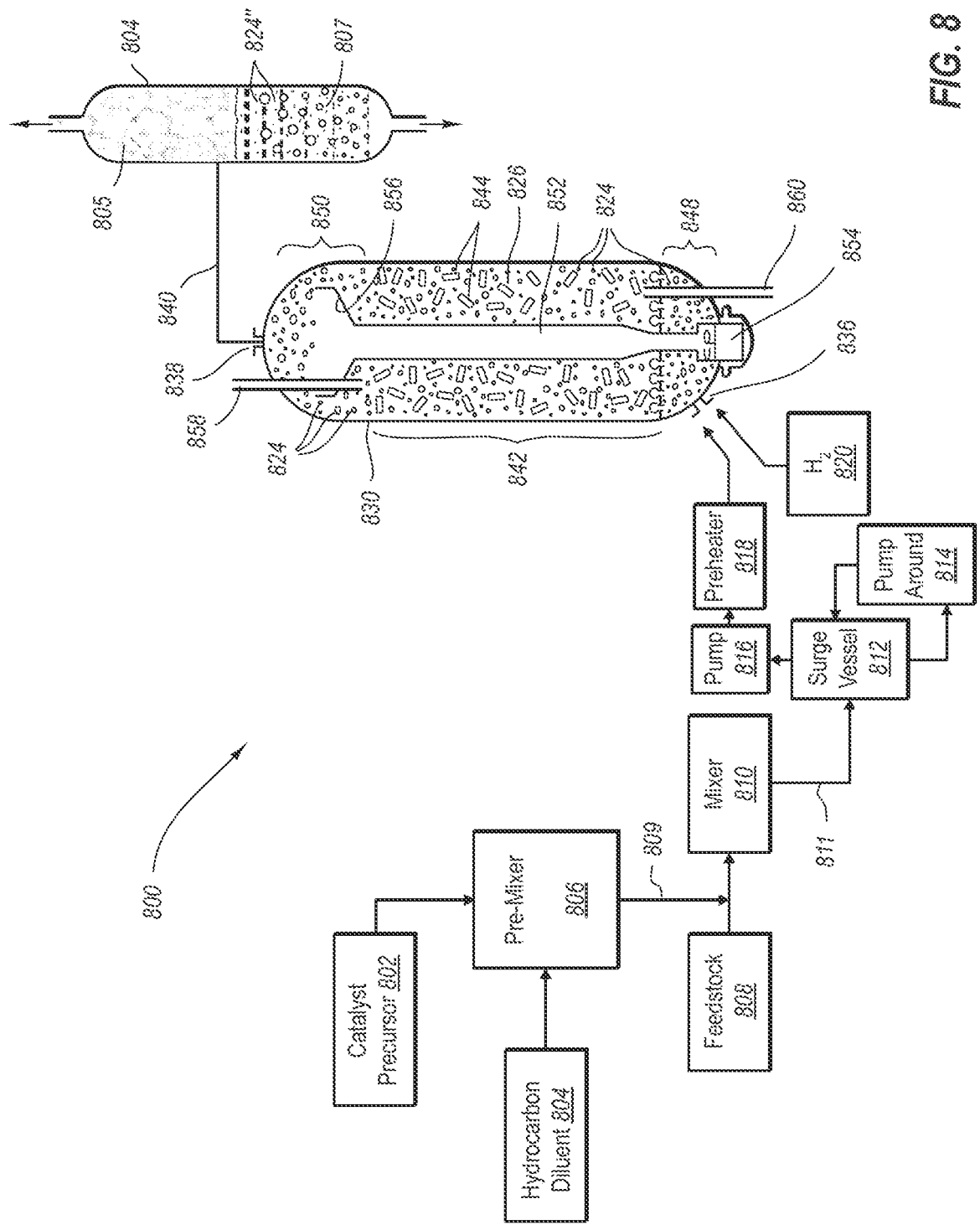
FIG. 8 schematically illustrates an exemplary ebullated bed hydroprocessing system using a dual catalyst system that can be used to hydroprocess heavy oil or deasphalted oil.

FIG. 8 schematically illustrates an example ebullated bed hydroprocessing system 800 that utilizes a dual catalyst system of dispersed metal sulfide catalyst particles and a heterogeneous ebullated bed catalyst. The ebullated bed hydroprocessing system 800 can be used in both the heavy oil hydroprocessing subsystem and the deasphalted oil hydroprocessing subsystem of the combined methods and systems. The dispersed metal sulfide catalyst particles can be generated separately and then added to the ebullated bed reactor which, together with the heterogeneous catalyst, form the dual catalyst system. Alternatively or in addition, at least a portion of the dispersed metal sulfide catalyst particles can be generated in situ within the ebullated bed reactor.

The ebullated bed hydroprocessing system 800 includes an ebullated bed reactor 830 and a separator 804 (such as a hot separator or distillation tower). A catalyst precursor 802 is blended with a hydrocarbon diluent 804 in one or more pre-mixers 806 to form a diluted precursor mixture 809. The diluted precursor mixture 809 is added to heavy oil or deasphalted oil feedstock 808 and blended with the feedstock in one or more mixers 810 to form a conditioned feedstock 811. The conditioned feedstock 811 is fed into a surge vessel 812 with a pump around loop 814 to effect further mixing and dispersion of the catalyst precursor 802 within the feedstock 808. The conditioned feedstock from the surge vessel 812 is pressurized by one or more pumps 816, passed through a pre-heater 818, and fed into the ebullated bed reactor 830 together with hydrogen gas 820 through an inlet port 836 located at or near the bottom of the ebullated bed reactor 830.

The ebullated bed reactor 830 includes a hydrocarbon material 826 and an expanded catalyst zone 842 comprising a heterogeneous catalyst 844 typical for ebullated bed reactors. A lower heterogeneous catalyst free zone 848 is located below the expanded catalyst zone 842, and an upper heterogeneous catalyst free zone 850 is located above the expanded catalyst zone 842. Dispersed metal sulfide catalyst particles 824 are dispersed throughout the hydrocarbon material 826 within the ebullated bed reactor 830, including in the expanded catalyst zone 842 and the heterogeneous catalyst free zones 848, 850, thereby being available to promote beneficial upgrading reactions in the absence of the heterogeneous catalyst 844.

The hydrocarbon material 826 in the ebullated bed reactor 830 is continuously recirculated from the upper heterogeneous catalyst free zone 850 to the lower heterogeneous catalyst free zone 848 by means of a recycling channel 852 connected to an ebullating pump 854. At the top of the recycling channel 852 is a funnel-shaped recycle cup 856 through which the hydrocarbon material 826 containing the dispersed catalyst particles 824 is drawn from the upper heterogeneous catalyst free zone 850. The recycled hydrocarbon material 826 is blended with new conditioned feedstock and hydrogen gas 820.

Fresh heterogeneous catalyst 844 is introduced into the ebullated bed reactor 830 through a catalyst inlet tube 858 and spent heterogeneous catalyst 844 is withdrawn through a catalyst withdrawal tube 860. The dispersed metal sulfide catalyst particles 824 provides additional catalytic activity within expanded catalyst zone 842, recycle channel 852, and lower and upper heterogeneous catalyst free zones 848, 850. The addition of hydrogen to hydrocarbons outside of the heterogeneous catalyst 844 minimizes formation of sediment and coke precursors, which are often responsible for deactivating the heterogeneous catalyst.

The ebullated bed reactor 830 further includes an outlet port 838 at or near the top through which converted materials 840 are withdrawn. The converted materials 840 are introduced into a separator 804, which separates one or more volatile fractions 805, which is/are withdrawn from the top of the hot separator 804, from a resid fraction 807, which is withdrawn from a bottom of the separator 804. The resid fraction 807 contains residual dispersed metal sulfide catalyst particles, schematically depicted as catalyst particles 824". If desired, at least a portion of the resid fraction 807 can be recycled back to the ebullated bed reactor 830 to form part of the feed material and provide supplemental dispersed metal sulfide catalyst particles. Alternatively, resid fraction 807 can be further processed using downstream processing equipment, such as another ebullated bed reactor, a distillation tower, a deasphalting unit, and the like.

The hydroprocessing systems are typically configured and operated to promote hydrocracking reactions rather than less severe hydroprocessing reactions, such as hydrotreating. Hydrocracking involves the breaking of carbon-carbon molecular bonds, such as reducing the molecular weight of larger hydrocarbon molecules and/or ring opening of aromatic compounds. Hydrotreating, on the other hand, mainly involves hydrogenation of unsaturated hydrocarbons, with minimal or no breaking of carbon-carbon molecular bonds.

To promote more severe hydrocracking reactions rather than less severe hydrotreating reactions, the hydroprocessing reactor(s) are preferably operated at a temperature in a range of about 750° F. (399° C.) to about 860° F. (460° C.), more preferably in a range of about 780° F. (416° C.) to about 830° F. (443° C.), are preferably operated at a pressure in a range of about 1000 psig (6.9 MPa) to about 3000 psig (20.7 MPa), more preferably in a range of about 1500 psig (10.3 MPa) to about 2500 psig (17.2 MPa), and are preferably operated at a space velocity (LHSV) in a range of about 0.05 $hr^{-1}$ to about 0.45 $hr^{-1}$, more preferably in a range of about 0.1 $hr^{-1}$ to about 0.35 $hr^{-1}$. The difference between hydrocracking and hydrotreating can be expressed in terms of resid conversion (whereas hydrocracking results in the substantial conversion of higher boiling to lower boiling hydrocarbons, hydrotreating does not).

The hydroprocessing systems disclosed herein can result in an overall resid conversion in a range of about 60% to about 95%, preferably in a range of about 75% to about 90%. The preferred conversion range typically depends on the type of feedstock because of differences in processing difficulty between different feedstocks.

Operating an ebullated bed reactor using a dual catalyst system can result in the same or reduced equipment fouling compared to operating the ebullated bed reactor with only a heterogeneous catalyst. For example, the rate of equipment fouling when using a dual catalyst system rather than a heterogeneous catalyst by itself can result in one or more of the following benefits: (i) reduced frequency of heat exchanger shutdowns and/or distillation tower shutdowns for cleanout; (ii) reduced frequency of changes or cleaning of filters and strainers; (iii) reduced frequency of switches to spare heat exchangers; (iv) reduced rate of decreasing skin temperatures in equipment such as heat exchangers, separators, or distillation towers; (v) reduced rate of increasing furnace tube metal temperatures; and (vi) reduced rate of increasing calculated fouling resistance factors for heat exchangers.

Figure 9:
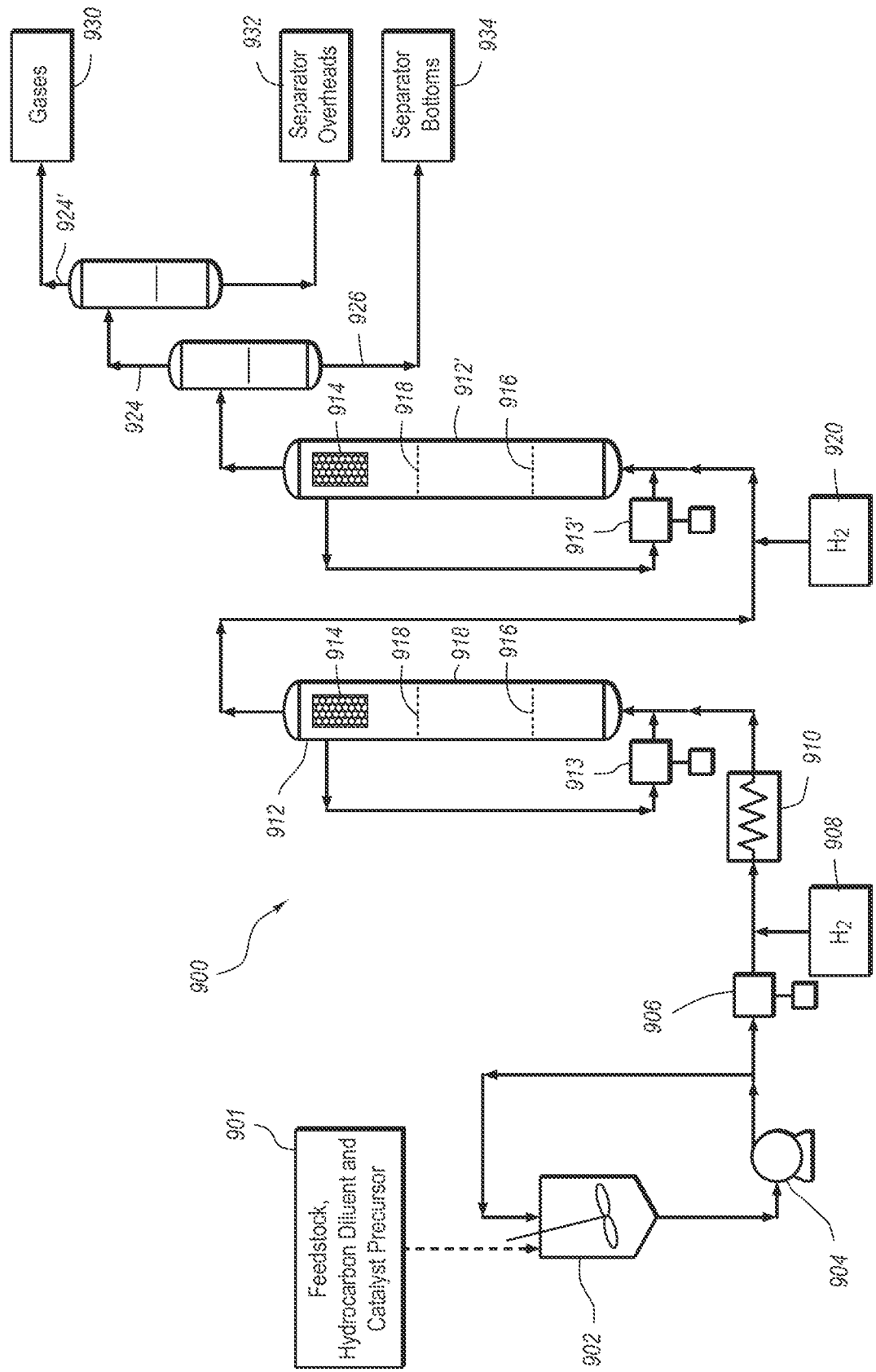
FIG. 9 schematically illustrates a pilot scale ebullated bed hydroprocessing system configured to employ either a heterogeneous catalyst by itself or a dual catalyst system including a heterogeneous catalyst and dispersed metal sulfide catalyst particles, which can be used to hydroprocess heavy oil or deasphalted oil and gather useful data.

FIG. 9 schematically illustrates a pilot plant 900 containing ebullated bed reactors 912, 912' that can be used to test and verify aspects of the heavy oil hydroprocessing and deasphalted oil hydroprocessing subsystems used in the combined hydroprocessing and deasphalting methods and systems disclosed herein. The pilot plant 900 includes a mixing device 902 for blending a heavy oil or deasphalted oil feedstock, hydrocarbon diluent, and catalyst precursor (e.g., molybdenum 2-ethylhexanoate, 15% molybdenum by weight) with a heavy oil feedstock (collectively depicted as 501) to form a conditioned feedstock. Dotted lines indicate batch wise processing, although it is within the scope of the disclosure to use continuous processing. More thorough blending is achieved by first pre-blending the catalyst precursor with the hydrocarbon diluent to form a diluted precursor mixture, which is then blended with the feedstock. A hydrotreated heavy vacuum gas oil can be used as the hydrocarbon diluent. In one embodiment, the diluted precursor mixture can be prepared so that 1 part by weight of the diluted precursor mixture can be added to 99 parts by weight of the feedstock to achieve a target loading of dispersed metal sulfide catalyst particles in the feedstock. For example, for a test study with a target loading of 30 ppm dispersed metal sulfide catalyst particles in a conditioned feedstock (where the loading is expressed based on metal concentration, not gross weight of catalyst precursor), the diluted precursor mixture can be prepared to include 3000 ppm of metal.

For comparative test studies in which no dispersed metal sulfide catalyst is used, a hydrocarbon diluent (e.g., hydrotreated heavy vacuum gas oil) can be added to the feedstock at the same proportion of 1 part by weight of HVGO to 99 parts by weight of feedstock. This ensures that the background composition is the same between tests using a dual catalyst system and those using only a heterogeneous ebullated bed catalyst, thereby allowing test results to be compared directly.

The heterogeneous catalyst can be a commercially available catalyst commonly used in ebullated bed reactors. The conditioned feedstock is recirculated out and back into the mixing vessel 902 by a pump 904, similar in concept to a surge vessel and pump-around in a commercial unit. A high precision positive displacement pump 906 is used to draw the conditioned feedstock from the recirculation loop and pressurize it to the reactor pressure. Hydrogen gas 908 is fed into the pressurized feedstock and the resulting mixture is passed through a pre-heater 910 prior to being introduced into a first pilot scale ebullated bed reactor 912.

In some embodiments, each pilot scale ebullated bed reactor 912, 912' can have an interior volume of about 3000 ml, although other sizes as desired can be used. A settled height of catalyst in each ebullated bed reactor 912, 912' is schematically indicated by a lower dotted line 916, and the upper extend of the expanded catalyst zone during use is schematically indicated by an upper dotted line 918. A mesh wire guard 914 is used to keep the heterogeneous catalyst from inadvertently escaping from the reactors. Each reactor 912, 912' is equipped with a recycle line 911, 911' and a recycle pump 913, 913', which provide the required flow velocity in the reactors 912, 912' to expand the heterogeneous catalyst bed. In some embodiments, the combined volume of both reactors 912, 912' and their respective recycle lines 911, 911' can be 6,700 ml, although other volumes as desired can be used. The combined volume is the thermal reaction volume of the system and can be used as the basis for calculating Liquid Hourly Space Velocity (LHSV), which is similar to throughput but normalized to eliminate reactor size and is inversely proportional to the dwell time of hydrocarbon materials in the reactors 912, 912'.

Upgraded hydrocarbon material 920 produced by the first reactor 912 is transferred together with supplemental hydrogen 908' into the second reactor 912' for further hydroprocessing and upgrading. A further upgraded material 920' from the second reactor 912' can be introduced into a hot separator 922 to separate low-boiling hydrocarbon products and gases 924 from an unconverted liquid fraction 926. The gases and hydrocarbon product vapors 924 can be cooled and passed into a cold separator 928, which further separates them into gases 930 and converted hydrocarbon products, which can be recovered as separator overheads 932.

The liquid fraction 926 from the hot separator 922 can be further processed using a separate (offline) batch vacuum distillation apparatus (not shown) to produce separator bottoms 934. Although vacuum distillation in a commercial unit is performed in a continuous online distillation tower, a batch distillation apparatus can be used for pilot plant tests for further study.

III. Hydroprocessing and Deasphalting Methods

Figure 10:
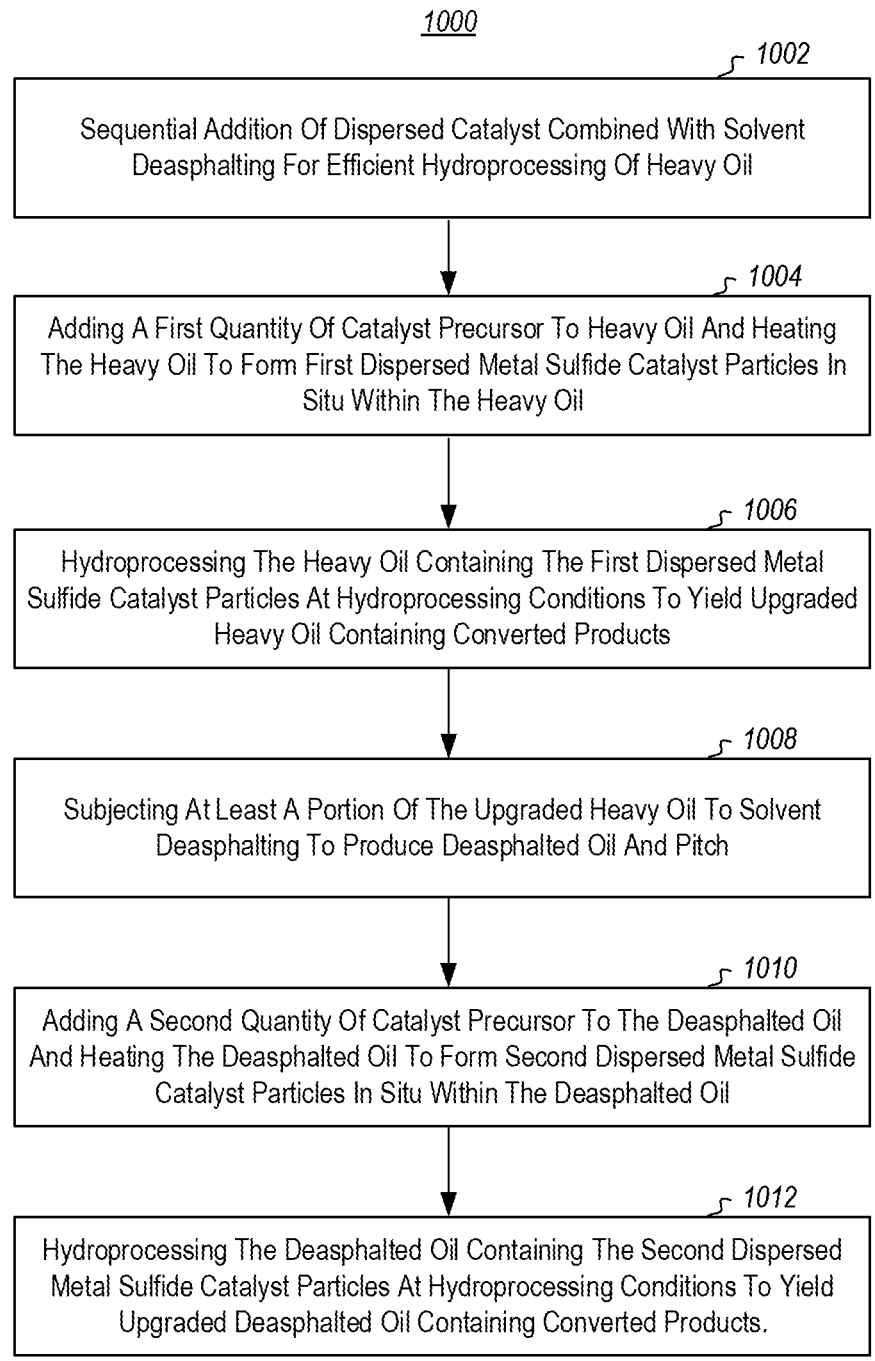
FIG. 10 is a flow diagram illustrating an exemplary method of hydroprocessing heavy oil using dispersed metal sulfide catalyst particles and solvent deasphalting, with sequential addition of catalyst precursor to form the dispersed catalyst.
Figure 11:
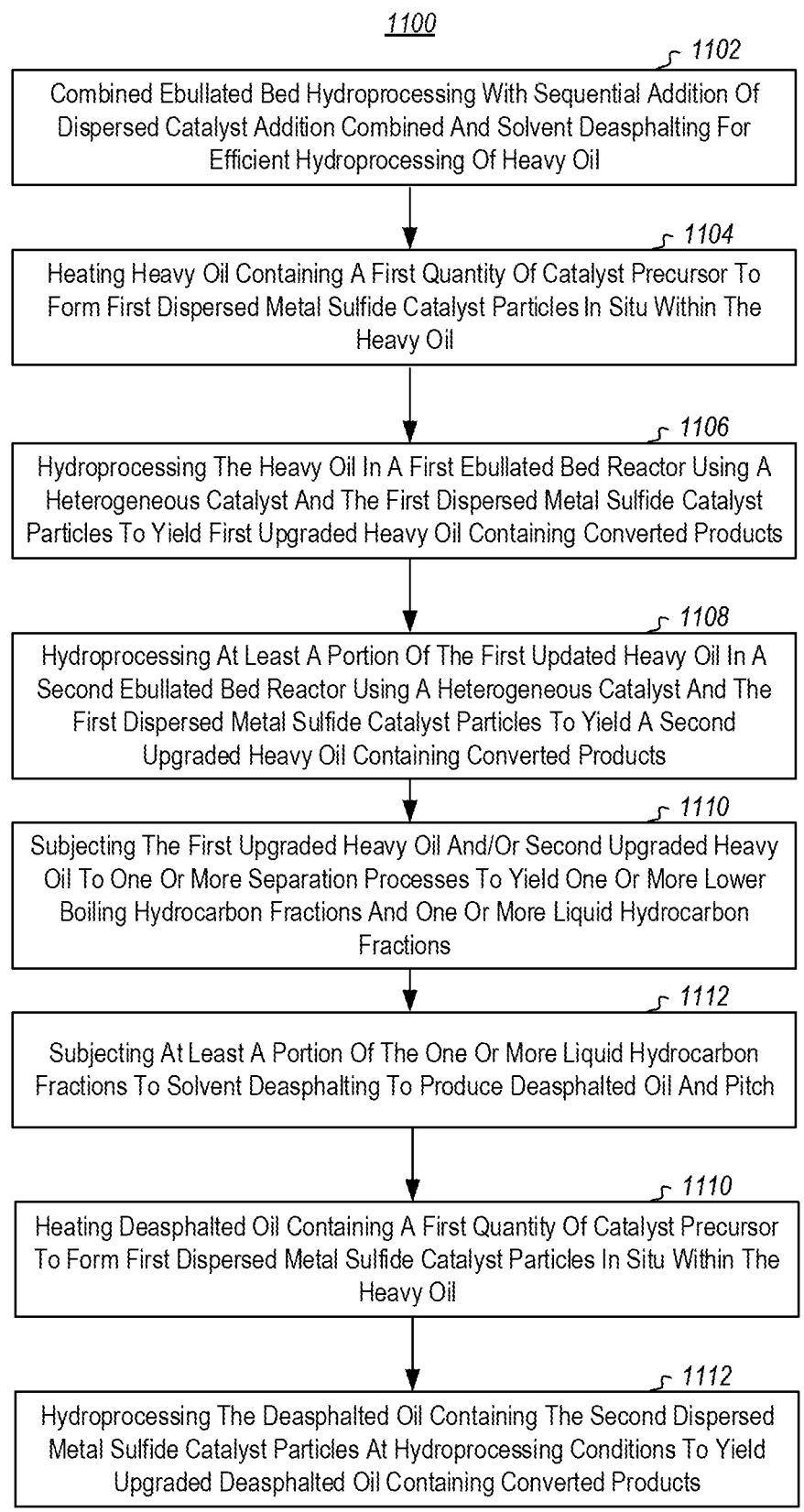
FIG. 11 is a flow diagram illustrating an exemplary method of hydroprocessing heavy oil using ebullated bed reactors combined with solvent deasphalting and use of dispersed metal sulfide catalyst particles.
Figure 12:
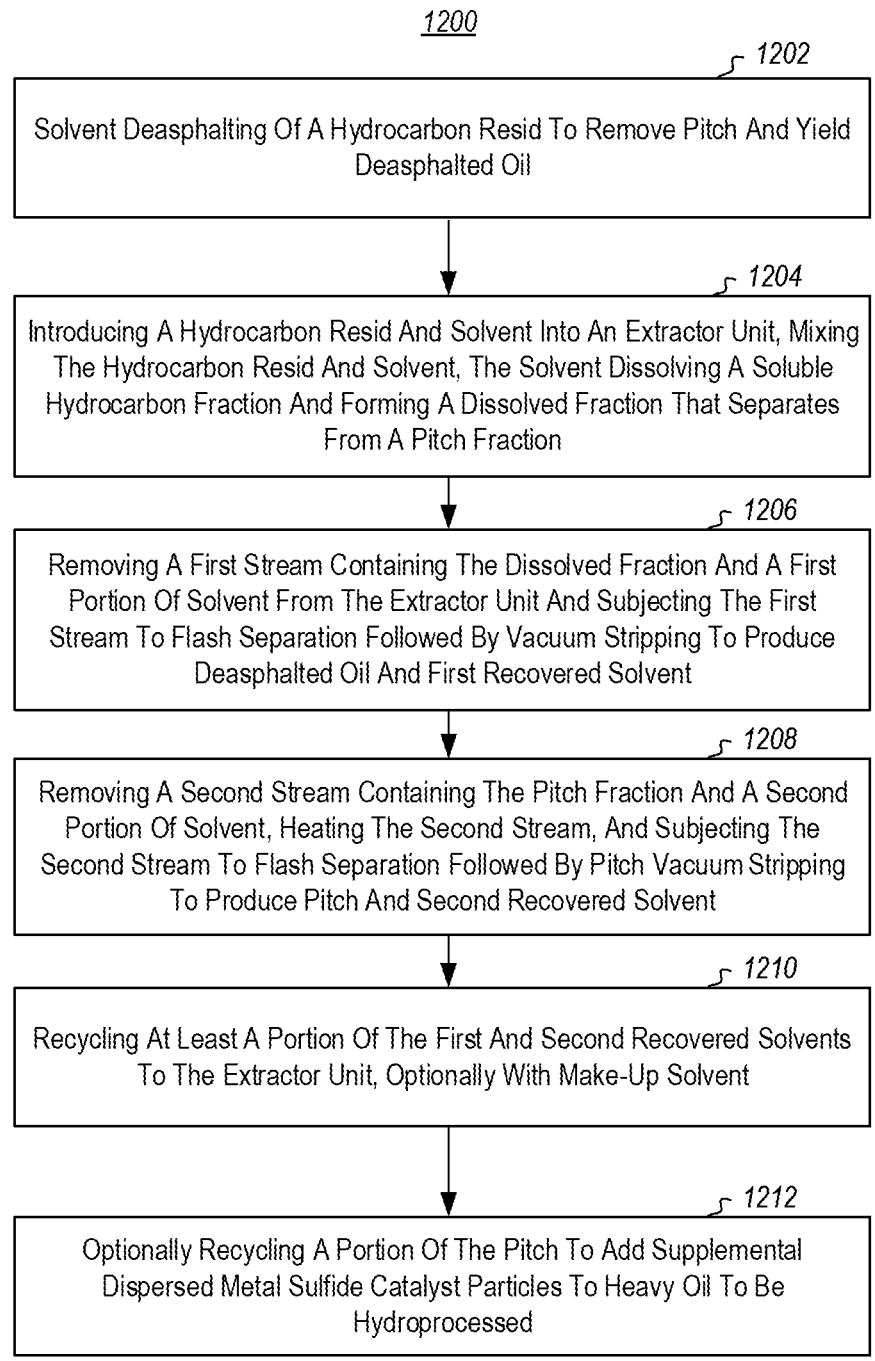
FIG. 12 is a flow diagram illustrating an exemplary method of solvent deasphalting of a hydrocarbon resid to separate soluble deasphalted oil from insoluble pitch prior to further hydroprocessing of the deasphalted oil using dispersed metal sulfide catalyst particles.

FIGS. 10-12 are flow diagrams that illustrate example methods for hydroprocessing heavy oil combined with solvent deasphalting and a sequentially added dispersed metal sulfide catalyst.

FIG. 10 illustrates an exemplary method 1000 of sequential addition of dispersed metal sulfide catalyst combined with solvent deasphalting for efficient hydroprocessing of heavy oil.

Step 1002 comprises the steps of adding a first quantity of catalyst precursor to heavy oil and heating the heavy oil to form first dispersed metal sulfide catalyst particles in situ within the heavy oil. As discussed herein, the catalyst precursor, when heated to above its decomposition temperature, decomposes to liberate metal and reacts with sulfur in the heavy oil to form dispersed metal sulfide catalyst particles. It is advantageous for the catalyst precursor to be highly dispersed throughout the heavy oil in order to form a conditioned feedstock before thermally decomposing the catalyst precursor and forming metal sulfide catalyst particles. The more thoroughly and finely the catalyst precursor is dispersed throughout the heavy oil, the smaller will be the resulting catalyst particles. Smaller catalyst particles are more numerous and have higher surface area than larger catalyst particles, thus greatly increasing catalytic activity.

To ensure thorough mixing of the catalyst precursor within the heavy oil, it is advantageous to first mix the catalyst precursor with a hydrocarbon diluent to form a catalyst precursor mixture, followed by blending the catalyst precursor mixture with the heavy oil to form the conditioned feedstock. Because hydrocarbon diluents typically do not require as high of a temperature as heavy oil to remain a flowable liquid, forming a catalyst precursor mixture is advantageous because it can further help to prevent premature heat-induced decomposition of the catalyst precursor before it has been thoroughly blended throughout the heavy oil.

Step 1004 comprises the step of hydroprocessing the heavy oil containing the first dispersed metal sulfide catalyst particles in one or more reactors operating at hydroprocessing conditions to yield upgraded heavy oil containing converted products. The hydroprocessing conditions can be any conditions suitable for hydroprocessing heavy oil. In some embodiments, the hydroprocessing conditions can be hydrocracking conditions, as discussed herein. Hydroprocessing of heavy oil can be performed using known hydroprocessing reactors, including ebullated bed reactor(s), fixed bed reactor(s), and slurry phase reactor(s).

The effluent from the one or more hydroprocessing reactors is subjected to one or more separation processes, such as flash separation, hot separation, atmospheric distillation, and vacuum distillation, to separate one or more volatile materials from a liquid hydrocarbon material that contains asphaltenes, metals, dispersed metal sulfide catalyst particles, sediment, high boiling hydrocarbons, and other nonvolatile materials.

Step 1006 comprises subjecting at least a portion of the upgraded heavy oil produced in step 1004 to solvent deasphalting to produce deasphalted oil and pitch. Advantageously, the material that is subjected to solvent deasphalting is advantageously the liquid hydrocarbon material produced in step 1004 by subjecting the upgraded heavy oil to one or more separation processes. This ensures that more valuable hydrocarbon products are not subjected to solvent deasphalting, which would reduce overall efficiency and economic benefits of combining hydroprocessing with solvent deasphalting. The step 1006 of subjecting a hydrocarbon resid or bottoms material to solvent deasphalting can be carried out using known solvent deasphalting processes. In some embodiments, solvent deasphalting can be performed using the solvent deasphalting system illustrated in FIG. 5 and/or the solvent deasphalting method illustrated in FIG. 12 and discussed herein.

Step 1008 comprises the steps of adding a second quantity of catalyst precursor to the deasphalted oil produced in step 1006 and heating the deasphalted oil to form second dispersed metal sulfide catalyst particles in situ within the deasphalted oil. Because the catalyst precursor typically thermally decomposes when heated to above its decomposition temperature, it is advantageous for the catalyst precursor to be highly dispersed throughout the deasphalted oil in order to form a conditioned deasphalted feedstock before thermally decomposing the catalyst precursor and forming the second metal sulfide catalyst particles. The more thoroughly and finely the catalyst precursor is dispersed throughout the deasphalted oil, the smaller and more catalytically active will be the resulting catalyst particles. It can be advantageous to mix the second quantity of catalyst precursor with a hydrocarbon diluent to form a second catalyst precursor mixture, followed by blending the second catalyst precursor mixture with the deasphalted oil to form conditioned deasphalted oil before heating the deasphalted oil and forming the second dispersed metal sulfide catalyst particles in situ.

Step 1010 comprises the step of hydroprocessing the deasphalted oil containing the second dispersed metal sulfide catalyst particles in one or more reactors operating at hydroprocessing conditions to yield upgraded deasphalted oil containing converted products. The hydroprocessing conditions can be any conditions suitable for hydroprocessing deasphalted oil. In some embodiments, the hydroprocessing conditions can be hydrocracking conditions. Hydroprocessing deasphalted oil can be performed using known hydroprocessing reactors, including ebullated bed reactor(s), fixed bed reactor(s), and slurry phase reactor(s).

The effluent from the one or more hydroprocessing reactors for deasphalted oil is subjected to one or more separation processes, such as flash separation, hot separation, atmospheric distillation, and vacuum distillation, to separate one or more volatile materials from a nonvolatile material, which contains asphaltenes, metals, dispersed metal sulfide catalyst particles, sediment, high boiling hydrocarbons, and other insoluble materials. Advantageously, the nonvolatile material is subjected to solvent deasphalting, as illustrated in FIG. 6, such as being combined with the residual material produced in step 1004 by one or more separation processes following hydroprocessing of heavy oil and then being subjected to solvent deasphalting in step 1006.

FIG. 11 illustrates another example method 1100 of sequential addition of dispersed metal sulfide catalyst combined with solvent deasphalting for efficient hydroprocessing of heavy oil. Method 1100 specifically involves the use of one or more ebullated bed reactors to hydroprocessing the heavy oil and deasphalted oil.

Step 1102 comprises the step of heating heavy oil containing a first quantity of catalyst precursor to form first dispersed metal sulfide catalyst particles in situ within the heavy oil. As discussed herein, it is advantageous for the catalyst precursor to be highly dispersed throughout the heavy oil before thermally decomposing the catalyst precursor and forming metal sulfide catalyst particles. To ensure thorough mixing of the catalyst precursor within the heavy oil, the catalyst precursor can be pre-mixed with a hydrocarbon diluent to form a catalyst precursor mixture, which is blended with the heavy oil to form a conditioned heavy oil prior to forming the dispersed metal sulfide catalyst particles in situ.

Step 1104 comprises the step of hydroprocessing the heavy oil in a first ebullated bed hydroprocessing reactor operating at desired conditions of severity based on temperature, conversion, and throughput using a dual catalyst system comprising a heterogeneous ebullated bed catalyst and the first dispersed metal sulfide catalyst particles to yield upgraded heavy oil containing converted products. The hydroprocessing conditions can be any conditions suitable for hydroprocessing heavy oil, such as hydrocracking conditions.

Step 1106 comprises the step of hydroprocessing at least a portion of the upgraded heavy oil from step 1104, such as a liquid hydrocarbon material produced by one or more separation processes, in a second ebullated bed hydroprocessing reactor operating at desired conditions of severity based on temperature, conversion, and throughput using a dual catalyst system comprising a heterogeneous ebullated bed catalyst and the first dispersed metal sulfide catalyst particles yield a second upgraded heavy oil containing converted products.

Step 1108 comprises subjecting the first upgraded heavy oil and/or the second upgraded heavy oil to one or more separation processes, such as hot separation, atmospheric distillation, and vacuum distillation, to separate one or more lower boiling fractions from one or more liquid hydrocarbon fractions, which typically contain asphaltenes, metals, the first dispersed metal sulfide catalyst particles, sediment, high boiling hydrocarbons, and other non-volatile materials.

Step 1110 comprises subjecting at least a portion of the one or more liquid hydrocarbon fractions from step 1108 to solvent deasphalting to produce deasphalted oil and pitch. Solvent deasphalting can be carried out using known solvent deasphalting processes and systems. In some embodiments, solvent deasphalting can be performed using the solvent deasphalting system illustrated in FIG. 5 and/or the solvent deasphalting method illustrated in FIG. 12 and discussed herein.

Step 1112 comprises the comprises the step of heating deasphalted oil from step 1110 containing a second quantity of catalyst precursor to form second dispersed metal sulfide catalyst particles in situ within the deasphalted oil. It is advantageous to disperse the catalyst precursor throughout the deasphalted oil before thermal decomposition of the catalyst precursor and formation of metal sulfide catalyst particles. To ensure thorough mixing of the catalyst precursor within the deasphalted oil, the catalyst precursor can be pre-mixed with a hydrocarbon diluent to form a diluted precursor mixture, which is blended with the deasphalted oil to form a conditioned deasphalted oil prior to forming the second quantity of dispersed metal sulfide catalyst particles in situ.

Step 1114 comprises the step of hydroprocessing the deasphalted oil, such as in an ebullated bed hydroprocessing reactor operating at desired conditions of severity based on temperature, conversion, and throughput using a dual catalyst system comprising a heterogeneous ebullated bed catalyst and the second dispersed metal sulfide catalyst particles to yield upgraded deasphalted oil containing converted products. The hydroprocessing conditions can be any conditions suitable for hydroprocessing deasphalted oil, such as hydrocracking conditions.

The effluent from hydroprocessing deasphalted oil can be subjected to one or more separation processes, such as hot separation, atmospheric distillation, and vacuum distillation, to separate one or more volatile fractions from a nonvolatile fraction, which contains asphaltenes, metals, dispersed metal sulfide catalyst particles, sediment, high boiling hydrocarbons, and other insoluble materials. The nonvolatile material can also be subjected to solvent deasphalting, as illustrated in FIG. 6, such as being combined with the residual material(s) produced in one or both of steps 1104, 1106, by one or more separation processes and being subjected to solvent deasphalting as in step 1110.

FIG. 12 illustrates an example method 1200 of solvent deasphalting of a hydrocarbon resid material to separate insoluble pitch from soluble deasphalted oil. The method 1200 can be performed using any desired solvent deasphalting system, such as the deasphalting system 500 illustrated in FIG. 5 or similar.

Step 1202 comprises introducing a hydrocarbon resid material and solvent into an extractor unit, mixing the hydrocarbon resid and solvent, upstream from and/or in the extractor unit. The solvent can be any solvent suitable for solvent deasphalting a hydrocarbon material containing insolubles, such as asphaltenes, metals, dispersed metal sulfide catalyst particles, sediment, and other solid materials. Advantageously, paraffinic solvents, such as propane, butane, pentane, hexane, and heptane, can be used and are efficient in dissolving soluble hydrocarbons and have sufficiently low viscosity to reject insoluble pitch materials, such as by centrifuging and/or gravitational settling. Lighter solvents (e.g., $C_3$ and $C_4$) reject a substantial amount of aromatic compounds and resins and achieve lower "lift" of DAO, while heaver solvents (e.g., $C_5$–$C_7$) extract more of the aromatic compounds and resins and therefore achieve higher lift.

Step 1204 comprises removing a first stream containing the dissolved hydrocarbon fraction and a first portion of the extraction solvent from the extractor unit and subjecting the first stream to flash separation, followed by vacuum stripping, to produce deasphalted oil and first recovered solvent. As illustrated in FIG. 5, the deasphalting system may include a series of flash separators that remove the extraction solvent from the deasphalted oil in stages. Such step-wise flash separation process maximizes throughput and minimizes dwell time in any one flash separator. Vacuum stripping may utilize steam to further heat the liquid material remaining after flash separation to ensure substantially thorough removal of any remaining solvent from the deasphalted oil. Because of this, the first recovered solvent may contain residual moisture, which can be removed, such as using a solvent drum that permits phase separation and draining of separated water.

Step 1206 comprises removing a second stream containing the insoluble pitch fraction and a second portion of the solvent from the extractor unit and subjecting the second stream to flash separation, followed by vacuum stripping, to produce pitch and second recovered solvent. As illustrated in FIG. 5, the deasphalting system may include a heater to preheat the pitch/solvent stream to ensure that a high percentage of residual solvent is removed by flash separation prior to vacuum stripping. This improves efficiency and reduces the need to use multiple flash separators. Vacuum stripping may utilize steam to further heat the remaining pitch/solvent mixture from the flash separator to ensure substantially thorough removal of any remaining solvent from the pitch. The second recovered solvent may therefore contain residual moisture, which can be removed using a solvent drum that permits phase separation and draining of separated water.

Step 1208 comprises recycling at least a portion of the first and second recovered solvents to the extractor unit, optionally with make-up solvent to compensate for solvent that is lost in the deasphalted oil and pitch streams. A first portion of solvent can be added to the extractor unit together with the liquid hydrocarbon material subjected to solvent deasphalting, and a second portion of the solvent can be added at or near the bottom the extractor unit to assist in removal of the pitch/solvent stream. In the absence of adding the second solvent, the pitch may not flow but may solidify and/or otherwise accumulate in the extractor unit and/or downstream conduits.

Step 1210 comprises optionally recycling a portion of the pitch produced in step 1208 as a source of supplemental dispersed metal sulfide catalyst particles to the heavy oil to be hydroprocessed. The amount of pitch that can be recycled may depend on whether or not it causes a recycle buildup of asphaltenes in the hydroprocessing reactor(s) for heavy oil. Recycling the pitch may be advantageous if the benefits of supplemental dispersed metal sulfide catalyst particles added to the heavy oil is greater than the detriments presented by the pitch, such as increased fouling, deactivation of the ebullated bed catalyst, and/or lower conversion of heavy oil. Through careful monitoring of equipment fouling and the rate of production of converted products, an operator can identify an optimal amount of pitch that can be beneficially recycled.

IV. Operating Conditions and Effects Using Combined Hydroprocessing and Deasphalting Methods and Systems Compared to hydroprocessing systems that omit dispersed metal sulfide catalyst particles when hydroprocessing heavy oil and deasphalted oil, such as conventional ebullated bed reactors that utilize a typical heterogeneous supported catalyst, the use of a dual catalyst system comprising the heterogeneous catalyst and dispersed metal sulfide catalyst particles permits operation of the ebullated bed reactors at significantly higher reactor severity without causing more equipment fouling and, in many cases, with reduced equipment fouling.

In addition, compared to ebullated bed hydroprocessing systems that employ a dual catalyst system comprising a heterogeneous catalyst and dispersed metal sulfide catalyst particles to hydroprocess heavy oil, but omit solvent deasphalting and sequential addition of dispersed metal sulfide catalyst particles, the methods and systems disclosed herein increase the overall quantity of converted products that are produced from a given quantity of heavy oil.

It has further been found, surprisingly and unexpectedly, that the quantity of converted products produced from a given quantity of heavy oil feed material can be increased even while using the same or reduced overall quantity of catalyst precursor and dispersed metal sulfide catalyst particles. This was particularly unexpected given the fact that a substantial portion of the dispersed metal sulfide catalyst particles utilized to hydroprocess heavy oil is removed in the pitch after solvent deasphalting of hydrocarbon resids from hydroprocessing heavy oil. Only a minor quantity, if any, of the dispersed metal sulfide catalyst particles remain in the deasphalted oil, which requires addition of another quantity of catalyst precursor to form dispersed metal sulfide catalyst particles used to hydroprocess deasphalted oil. Even so, a given amount of dispersed metal sulfide catalyst particles utilized in the disclosed methods and systems results in the production of a greater quantity of converted products compared to an ebullated bed hydroprocessing system that uses a dual catalyst system but omits solvent deasphalting.

In general, the production rate of converted products when hydroprocessing heavy oil and deasphalted oil can be increased by increasing reactor severity, which is the amount of energy that is input into the system, such as by one or more of: (i) higher temperature and higher conversion at same or similar throughput; (ii) higher temperature and higher throughput at same or similar conversion; or (iii) higher temperature, higher throughput, and higher conversion. The disclosed methods and systems permit the operation of ebullated bed reactors at significantly higher reactor severity without causing greater equipment fouling and, in many cases, reducing equipment fouling, compared to conventional systems for processing heavy oil.

In some embodiments, the production rate of converted products can be increased by increasing throughput of heavy oil by at least 2.5%, at least 5%, at least 10%, or at least 20%, while maintaining or increasing one or both of temperature and conversion.

In some embodiments, the production rate of converted products can be increased by increasing conversion of heavy oil by at least 2.5%, at least 5%, at least 7.5%, at least 10%, or at least 15%, while maintaining or increasing one or both of temperature and throughput.

In some embodiments, the production rate of converted products can be increased by increasing the reactor operating temperature by at least 2.5° C., at least 5° C., at least 7.5° C., or at least 10° C., which results in increased conversion of heavy oil if throughput is maintained or not increased beyond a threshold level at which increased throughput offsets the enhanced hydroprocessing effects of increased temperature so as to not increase conversion. In view of this, it will be appreciated that such increases in operating temperature permit increased throughput of heavy oil without reducing conversion if the throughput is not increased beyond the threshold level at which increased throughput more than offsets the enhanced effects of increased temperature.

In some embodiments, the disclosed methods and systems can reduce the rate of equipment fouling by at least 5%, 25%, 50%, or 75% compared to the rate of equipment fouling of conventional systems for processing heavy oil.

In some embodiments, the dispersed metal sulfide catalyst particles are formed in situ within an entirety of heavy oil or deasphalted oil added to the hydroprocessing reactors. This can be accomplished by initially mixing a catalyst precursor with the entirety of the heavy oil or deasphalted oil to form conditioned feedstocks and thereafter heating the conditioned feedstocks to decompose the catalyst precursor and cause or allow catalyst metal to react with sulfur and/or sulfur-containing molecules in and/or added to the heavy oil or deasphalted oil to form the dispersed metal sulfide catalyst particles in situ.

The catalyst precursor can be oil-soluble and have a decomposition temperature in a range from about 100° C. (212° F.) to about 350° C. (662° F.), or in a range of about 150° C. (302° F.) to about 300° C. (572° F.), or in a range of about 175° C. (347° F.) to about 250° C. (482° F.). Example catalyst precursors include organometallic complexes or compounds, more specifically oil soluble compounds or complexes of transition metals and organic acids, having a decomposition temperature or range high enough to avoid substantial decomposition when mixed with a heavy oil or deasphalted oil feedstock under suitable mixing conditions. When mixing the catalyst precursor with a hydrocarbon oil diluent, it is advantageous to maintain the diluent at a temperature below which significant decomposition of the catalyst precursor occurs. One skilled in the art can select a mixing temperature profile that results in intimate mixing of a selected precursor composition without substantial decomposition prior to formation of the dispersed metal sulfide catalyst particles in situ.

Example catalyst precursors include, but are not limited to, molybdenum 2-ethylhexanoate, molybdenum octoate, molybdenum naphthenate, vanadium naphthenate, vanadium octoate, molybdenum hexacarbonyl, vanadium hexacarbonyl, and iron pentacarbonyl. Other catalyst precursors include molybdenum salts comprising a plurality of cationic molybdenum atoms and a plurality of carboxylate anions of at least 8 carbon atoms and that are at least one of (a) aromatic, (b) alicyclic, or (c) branched, unsaturated and aliphatic. By way of example, each carboxylate anion may have between 8 and 17 carbon atoms or between 11 and 15 carbon atoms. Examples of carboxylate anions that fit at least one of the foregoing categories include carboxylate anions derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), and combinations thereof.

In other embodiments, carboxylate anions suitable for use in making oil soluble, thermally stable, molybdenum catalyst precursor compounds are derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof. It has been discovered that molybdenum catalyst precursors made using carboxylate anions derived from the foregoing carboxylic acids possess improved thermal stability.

Catalyst precursors with higher thermal stability can have a first decomposition temperature higher than 210° C., higher than about 225° C., higher than about 230° C., higher than about 240° C., higher than about 275° C., or higher than about 290° C. Such catalyst precursors can have a peak decomposition temperature higher than 250° C., or higher than about 260° C., or higher than about 270° C., or higher than about 280° C., or higher than about 290° C., or higher than about 330° C.

Whereas it is within the scope of the invention to directly blend the catalyst precursor with heavy oil and deasphalted oil feedstocks, care must be taken in such cases to mix the components for a time sufficient to thoroughly blend the catalyst precursor within the feedstock before substantial decomposition of the precursor composition has occurred. For example, U.S. Pat. No. 5,578,197 to Cyr et al., which is incorporated by reference in its entirety, describes a method in which molybdenum 2-ethyl hexanoate was mixed with bitumen vacuum tower residuum for 24 hours before the resulting mixture was heated in a reaction vessel to form the active catalyst and effect hydrocracking (see col. 10, lines 4-43). Whereas 24-hour mixing in bench-scale testing may be acceptable for lab work, such long mixing times are typically not industrially and economically feasible. To ensure thorough mixing of the catalyst precursor within the heavy oil or deasphalted oil prior to heating to form the active catalyst, a series of mixing steps are performed by different mixing apparatus prior to heating the conditioned feedstock. These may include one or more low shear in-line mixers, followed by one or more high shear mixers, followed by a surge vessel and pump-around system, followed by one or more multi-stage high pressure pumps used to pressurize the conditioned feedstock prior to introducing it into a hydroprocessing reactor.

In some embodiments, the conditioned feedstock is preheated using a heating apparatus before entering the hydroprocessing reactor in order to form at least a portion of the dispersed metal sulfide catalyst particles in situ within the heavy oil or deasphalted oil before entering the reactor. In other embodiments, the conditioned feedstock can be heated or further heated in the hydroprocessing reactor in order to form at least a portion of the dispersed metal sulfide catalyst particles in situ within the heavy oil or deasphalted oil.

In some embodiments, the dispersed metal sulfide catalyst particles can be formed in a multi-step process. For example, an oil-soluble catalyst precursor composition can be pre-mixed with a hydrocarbon diluent to form a diluted precursor mixture. Examples of suitable hydrocarbon diluents include, but are not limited to, vacuum gas oil (which typically has a nominal boiling range of 360-524° C.) (680-975° F.), decant oil or cycle oil (which typically has a nominal boiling range of 360° -550° C.) (680-1022° F.), and atmospheric gas oil (which typically has a nominal boiling range of 200° -360° C.) (392-680° F.), a portion of the heavy oil or deasphalted oil feedstock, and other hydrocarbons that nominally boil at a temperature higher than about 200° C.

The ratio of catalyst precursor to hydrocarbon oil diluent used to make the diluted precursor mixture can be in a range of about 1:500 to about 1:1, or in a range of about 1:150 to about 1:2, or in a range of about 1:100 to about 1:5 (e.g., 1:100, 1:50, 1:30, or 1:10). The amount of catalyst metal (e.g., molybdenum) in the diluted precursor mixture is preferably in a range of about 100 ppm to about 7000 ppm, more preferably in a range of about 300 ppm to about 4000 ppm, by weight of the diluted precursor mixture.

The catalyst precursor is advantageously mixed with the hydrocarbon diluent below a temperature at which a significant portion of the catalyst precursor decomposes. The mixing may be performed at temperature in a range of about 25° C. (77° F.) to about 250° C. (482° F.), or in range of about 50° C. (122° F.) to about 200° C. (392° F.), or in a range of about 75° C. (167° F.) to about 150° C. (302° F.), to form the diluted precursor mixture. The temperature at which the diluted precursor mixture is formed may depend on the decomposition temperature and/or other characteristics of the catalyst precursor that is utilized and/or characteristics of the hydrocarbon diluent, such as viscosity.

The catalyst precursor is preferably mixed with the hydrocarbon oil diluent for a time period in a range of about 0.1 second to about 5 minutes, or about 0.3 second to about 3 minutes, or about 0.5 second to about 1 minute, or about 0.7 second to about 30 seconds, or about 1 second to about 10 seconds. The actual mixing time is dependent, at least in part, on the temperature (i.e., which affects the viscosity of the fluids) and mixing intensity. Mixing intensity is dependent, at least in part, on the number of stages e.g., for an in-line static mixer.

Pre-blending the catalyst precursor with a hydrocarbon diluent to form a diluted precursor mixture, which is then blended with the heavy oil or deasphalted oil feedstock, greatly aids in thoroughly and intimately blending the catalyst precursor into the feedstock, particularly in the relatively short time periods required for large-scale industrial operations. Forming a diluted precursor mixture shortens the overall mixing time by (1) reducing or eliminating differences in solubility between a more polar catalyst precursor and a more hydrophobic heavy oil or deasphalted oil feedstock, (2) reducing or eliminating differences in rheology between the catalyst precursor and heavy oil or deasphalted oil feedstock, and/or (3) breaking up catalyst precursor molecules to form a solute within the hydrocarbon diluent that is more easily dispersed within the heavy oil or deasphalted oil feedstock.

The diluted precursor mixture is then combined with a heavy oil or deasphalted oil and mixed for a time sufficient and in a manner so as to disperse the catalyst precursor throughout the heavy oil or deasphalted oil to form a conditioned feedstock in which the catalyst precursor is thoroughly mixed with the feedstock before thermal decomposition and formation of active metal sulfide catalyst particles in situ. In order to obtain sufficient mixing of the catalyst precursor within the feedstock, the diluted precursor mixture and feedstock are advantageously mixed for a time period in a range of about 0.1 second to about 5 minutes, or in a range from about 0.5 second to about 3 minutes, or in a range of about 1 second to about 1 minute.

Increasing the vigorousness and/or shearing energy of the mixing process generally reduce the time required to effect thorough mixing.

Examples of mixing apparatus that can be used to effect thorough mixing of the catalyst precursor and/or diluted precursor mixture with heavy oil and deasphalted oil feedstocks include, but are not limited to, high shear mixing such as mixing created in a vessel with a propeller or turbine impeller; multiple static in-line mixers; multiple static in-line mixers in combination with in-line high shear mixers; multiple static in-line mixers in combination with in-line high shear mixers followed by a surge vessel; combinations of the above followed by one or more multi-stage centrifugal pumps; and one or more multi-stage centrifugal pumps. According to some embodiments, continuous rather than batch-wise mixing can be carried out using high energy pumps having multiple chambers within which the catalyst precursor composition and heavy oil or deasphalted oil feedstocks are churned and mixed as part of the pumping process itself. The foregoing mixing apparatus may also be used for the pre-mixing process discussed above in which the catalyst precursor is mixed with the hydrocarbon diluent to form the catalyst precursor mixture.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock. In general, decreasing the viscosity of the heavy oil feedstock will reduce the time required to effect thorough and intimate mixing of the oil soluble precursor composition within the feedstock. However, it can also cause premature decomposition of the catalyst precursor. One can select a catalyst precursor having a decomposition temperature suitable for a given heavy oil feedstock.

The heavy oil feedstock and catalyst precursor and/or diluted precursor mixture are advantageously mixed at a temperature in a range of about 25° C. (77° F.) to about 350° C. (662° F.), or in a range of about 50° C. (122° F.) to about 300° C. (572° F.), or in a range of about 75° C. (167° F.) to about 250° C. (482° F.) to yield a conditioned feedstock.

In the case where the catalyst precursor is mixed directly with heavy oil or deasphalted oil feedstock without first forming a diluted precursor mixture, it may be advantageous to mix the catalyst precursor and feedstock for a time period in a range of about 0.2 second to about 10 minutes, or in a range from about 1 second to about 6 minutes, or in a range of about 2 seconds to about 2 minutes. It may also be advantageous to mix the catalyst precursor and feedstock below a temperature at which a significant portion of the catalyst precursor composition decomposes.

In the case where the catalyst precursor is premixed with a hydrocarbon diluent to form a diluted precursor mixture, which is thereafter mixed with the heavy oil or deasphalted oil feedstock, it may be permissible for the feedstock to be at or above the decomposition temperature of the catalyst precursor. In some cases, the hydrocarbon diluent shields the individual catalyst precursor molecules and prevents them from agglomerating to form larger particles, temporarily insulates the catalyst precursor molecules from heat from the heavy oil or deasphalted oil during mixing and facilitates dispersion of the catalyst precursor molecules sufficiently quickly throughout the feedstock before decomposing to liberate metal. In addition, additional heating of the feedstock may be necessary to liberate hydrogen sulfide from sulfur-bearing molecules in the heavy oil or deasphalted oil to form the metal sulfide catalyst particles. In this way, progressive dilution of the catalyst precursor permits a high level of dispersion within the heavy oil and deasphalted oil feedstocks, resulting in the formation of highly dispersed metal sulfide catalyst particles, even where the feedstock is at a temperature above the decomposition temperature of the catalyst precursor.

After the catalyst precursor has been well-mixed throughout the heavy oil or deasphalted oil to yield a conditioned feedstock, this composition is heated to cause decomposition of the catalyst precursor, which liberates catalyst metal therefrom, causes or allows catalyst metal to react with sulfur within and/or added to the heavy oil or deasphalted oil, and forms the active metal sulfide catalyst particles in situ. Metal from the catalyst precursor may initially form a metal oxide, which then reacts with sulfur in the heavy oil or deasphalted oil to yield a metal sulfide compound that forms the final active catalyst. In the case where the heavy oil and/or the deasphalted oil feedstocks include(s) sufficient or excess sulfur, the final activated catalyst may be formed in situ by heating the feedstock to a temperature sufficient to liberate sulfur therefrom. In some cases, sulfur may be liberated at the same temperature that the catalyst precursor decomposes. In other cases, further heating to a higher temperature may be required. Hydrogen sulfide gas can be added to heavy oil or deasphalted oil that lack sufficient sulfur to form active metal sulfide catalyst particles.

If the catalyst precursor is thoroughly mixed throughout the heavy oil or deasphalted oil, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the catalyst precursor throughout the feedstock prior to thermal decomposition of the catalyst precursor may yield individual catalyst molecules rather than colloidal particles. Simply blending, while failing to sufficiently mix, the catalyst precursor with the feedstock typically causes formation of large, agglomerated metal sulfide compounds that are micron-sized or larger.

In order to form dispersed metal sulfide catalyst particles, the conditioned feedstock is heated to a temperature in a range of about 275° C. (527° F.) to about 450° C. (842° F.), or in a range of about 310° C. (590° F.) to about 430° C. (806° F.), or in a range of about 330° C. (626° F.) to about 410° C. (770° F.).

The concentration of catalyst metal provided by the dispersed metal sulfide catalyst particles in the heavy oil can be in a range of about 1 ppm to about 150 ppm by weight, or in a range of about 5 ppm to about 95 ppm by weight, or in a range of about 10 ppm to about 90 ppm by weight, of the heavy oil and any diluents.

The concentration of catalyst metal provided by the dispersed metal sulfide catalyst particles in the deasphalted oil can be in a range of about 0.1 ppm to about 50 ppm by weight, or in a range of about 0.5 ppm to about 30 ppm by weight, or in a range of about 1 ppm to about 20 ppm by weight, of the deasphalted oil.

The catalyst may become more concentrated as volatile fractions are removed from a residue fraction being hydroprocessed. Recycling of vacuum bottoms and/or pitch can provide supplemental dispersed metal sulfide catalyst particles, which can maintain a desired concentration in the ebullated bed reactor with decreased use of catalyst precursor, or it can increase the concentration of dispersed metal sulfide catalyst particles that can assist in hydroprocessing the additional asphaltenes provided by recycled vacuum bottoms and/or pitch.

In the case where the heavy oil or deasphalted oil includes a significant quantity of asphaltene molecules, the dispersed metal sulfide catalyst particles may preferentially associate with or remain in close proximity to the asphaltene molecules. Asphaltene molecules can have a greater affinity for the metal sulfide catalyst particles since asphaltene molecules are generally more hydrophilic and less hydrophobic than other hydrocarbons contained in heavy oil or deasphalted oil. Because metal sulfide catalyst particles tend to be hydrophilic, the individual particles or molecules will tend to migrate toward more hydrophilic moieties or molecules within the heavy oil feedstock.

While the highly polar nature of metal sulfide catalyst particles causes or allows them to associate with asphaltene molecules, it is the general incompatibility between the highly polar catalyst compounds and hydrophobic heavy oil and deasphalted oil that necessitates the aforementioned intimate or thorough mixing of catalyst precursor composition within the feedstock prior to decomposition and formation of the active catalyst particles in situ. Because metal catalyst compounds are highly polar, they cannot be effectively dispersed within heavy oil or deasphalted oil if added directly. In practical terms, forming smaller active catalyst particles results in a greater number of catalyst particles that provide more evenly distributed catalyst sites throughout the heavy oil. It also increases catalyst surface area.

In some embodiments, the first quantity of catalyst precursor added to the heavy oil is greater than the second quantity of catalyst precursor added to the deasphalted oil. For example, the first quantity of catalyst precursor added to the heavy oil can be greater than the second quantity of catalyst precursor added to the deasphalted oil by at least about 25%, at least about 50%, at least about 75%, at least about 100%, at least about 150%, at least about 200%, at least about 300%, at least about 400%, or at least about 500%.

In some embodiments, the heavy oil includes a higher concentration of dispersed metal sulfide catalyst particles during hydroprocessing than the deasphalted oil. For example, the concentration of dispersed metal sulfide catalyst particles in the heavy oil during hydroprocessing can be greater than the concentration of dispersed metal sulfide catalyst particles in the deasphalted oil during hydroprocessing by at least about 5%, at least about 10%, at least about 15%, at least about 20%, at least about 25%, at least about 30%, at least about 40%, or at least about 50%.

As an example of how the improved hydroprocessing system more efficiently hydroprocess heavy oil utilizing the dispersed metal sulfide catalyst particles, the total quantity of catalyst precursor required to produce a given quantity of converted products using combined hydroprocessing and solvent deasphalting as disclosed herein is less than the total quantity catalyst precursor required to produce the same given quantity of converted products in the absence of solvent deasphalting and sequential addition of dispersed metal catalyst particles, such as a hydroprocessing method or system that utilizes a dual catalyst system in an ebullated bed reactor but in the absence of solvent deasphalting and sequential addition of dispersed metal catalyst particles. For example, the total quantity of catalyst precursor required to produce the given quantity of converted products is reduced by at least about 2.5%, at least about 5%, at least about 10%, at least about 15%, at least about 20%, or at least about 25%, compared to the total quantity catalyst precursor required to produce the same given quantity of converted products in a hydroprocessing method or system that utilizes a dual catalyst system in an ebullated bed reactor but in the absence of solvent deasphalting and sequential addition of dispersed metal catalyst particles.

As another example of how the improved hydroprocessing system more efficiently hydroprocess heavy oil utilizing the dispersed metal sulfide catalyst particles, the total quantity of pitch produced by solvent deasphalting after hydroprocessing the heavy oil in the presence of the dispersed metal sulfide particles is less than the total quantity of pitch produced by solvent deasphalting in the absence of hydroprocessing the heavy oil in the presence of the dispersed metal sulfide particles. For example, the total quantity of pitch produced by solvent deasphalting after hydroprocessing the heavy oil in the presence of the dispersed metal sulfide particles is reduced by at least about 2.5%, at least about 5%, at least about 7.5%, at least about 10%, or at least about 15%, compared to the total quantity of pitch produced by solvent deasphalting in the absence of hydroprocessing the heavy oil in the presence of the dispersed metal sulfide particles.

It has been found that the addition to or formation of a second quantity of dispersed metal particles in the deasphalted oil can be advantageous when at least a portion the first quantity of dispersed metal sulfide particles remain in the pitch after solvent deasphalting—that is, when the deasphalted oil does not include all or even a majority of the first quantity of dispersed metal sulfide catalyst particles contained in the upgraded heavy oil following hydroprocessing.

It has been found that at least about 20%, at least about 30%, at least about 40%, at least about 50%, at least about 60%, at least about 70%, or at least about 80%, of the first dispersed metal sulfide catalyst particles remains in the pitch after solvent deasphalting, such that the deasphalted oil contains a depleted quantity of the dispersed metal sulfide catalyst particles as a result of being removed in the pitch. In some cases, essentially all the first dispersed metal sulfide catalyst particles remain in the pitch and essentially none remains in the deasphalted oil.

Because the pitch can contain a substantial quantity of dispersed metal catalyst particles, it can be advantageous in some embodiments to recycle at least a portion of the pitch by adding it to the heavy oil to be hydroprocessed in order to provide supplemental dispersed metal sulfide catalyst particles in addition to the first dispersed metal sulfide catalyst particles. The amount of recycled pitch can be selected so that the benefit of including more dispersed metal sulfide catalyst particles outweighs the detriments caused by adding pitch to the heavy oil.

Compared to hydroprocessing heavy oil in an ebullated bed reactor using a dual catalyst system comprising a heterogeneous catalyst and dispersed metal sulfide catalyst particles but that omits solvent deasphalting, the disclosed process and system that combine hydroprocessing of heavy oil and deasphalted oil using a dispersed metal sulfide catalyst and solvent deasphalting permits operation of the ebullated bed reactors at higher overall severity than in the absence of solvent deasphalting.

For example, the disclosed process and system can involve an increase in operating temperature of one or more ebullated bed reactors of at least 2.5° C., at least 5° C., at least 7.5° C., or at least 10° C. compared to hydroprocessing without solvent deasphalting and sequential addition of dispersed metal sulfide catalyst particles.

In addition, or alternatively, the disclosed process and system can involve an increase in throughput of heavy oil of at least 2.5%, at least 5%, at least 10%, or at least 20% compared to hydroprocessing without solvent deasphalting and sequential addition of dispersed metal sulfide catalyst particles.

In addition, or alternatively, the disclosed process and system can involve an increase in conversion of heavy oil of at least 2.5%, at least 5%, at least 7.5%, at least 10%, or at least 15% compared to hydroprocessing without solvent deasphalting and sequential addition of dispersed metal sulfide catalyst particles.

Compared to hydroprocessing heavy oil in an ebullated bed reactor using a dual catalyst system comprising a heterogeneous catalyst and dispersed metal sulfide catalyst particles but that omits solvent deasphalting, the disclosed process and system that combines hydroprocessing of heavy oil and deasphalted oil using a dispersed metal sulfide catalyst and solvent deasphalting can decrease the rate of equipment fouling. In some embodiments, the disclosed process and system can reduce the rate of equipment fouling by at least 5%, at least 10%, at least 15%, or at least 20% compared to equipment fouling using the same catalyst system at the same overall rate of production of converted products but in the absence of solvent deasphalting.

The rate of equipment fouling can be measured by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnarounds.

V. Experimental Studies and Results

Two case studies (Examples 1 and 2) compared conventional hydroprocessing and solvent deasphalting with hydroprocessing and solvent deasphalting with sequential addition or formation of dispersed metal sulfide catalyst particles in the heavy oil and deasphalted oil. It was found that utilization of dispersed metal sulfide catalyst particles allowed the conversion of heavy oil in the hydroprocessing reactors to be maximized prior to solvent deasphalting, which greatly enhanced performance of the solvent deasphalting system and the overall performance of the entire process scheme. In one aspect, using the dispersed metal sulfide catalyst particles increased asphaltene conversion compared to using a heterogeneous catalyst alone and substantially reduced the quantity of pitch that had to be processed and removed by the solvent deasphalting system.

It was expected that solvent deasphalting would remove up to 60% by weight of the dispersed metal sulfide catalyst particles used to hydroprocess the heavy oil. Based on this assumption, it was postulated that enough of the dispersed metal sulfide catalyst particles would remain in the deasphalted oil to ensure efficiency of the overall process. In fact, it was determined that most or all of the dispersed metal sulfide catalyst particles remained in the pitch and was not carried over into the deasphalted oil. Surprisingly and unexpectedly, the process was nevertheless able to more efficiently hydroprocess a given quantity of heavy oil using a given quantity of catalyst precursor compared to an ebullated bed hydroprocessing system that utilizes a dual catalyst system to hydroprocess heavy oil but that omits solvent deasphalting.

EXAMPLES 1 and 2

In Example 1, design basis conversion was increased by 5% by volume with constant sediment basis compared to a conventional hydroprocessing system that incorporates solvent deasphalting but omits the dispersed metal sulfide catalyst particles. Based on the test results reported below, it may be possible to increase conversion by more than 5% by volume without increased sediment production and equipment fouling.

In Example 2, throughput was increased by 8.5% (482 tons per hour) with constant conversion and sediment basis compared to a conventional hydroprocessing system that incorporates solvent deasphalting but omits the dispersed metal sulfide catalyst particles.

The improvements in overall process performance and yield benefits for the disclosed methods and systems compared to conventional hydroprocessing and solvent deasphalting that omits the dispersed metal sulfide catalyst particles are summarized in Tables 1 and 2 below. The dispersed metal sulfide catalyst particles are abbreviated as "DMSC". The baseline case is conventional hydroprocessing and solvent deasphalting that omits DMSC.

TABLE 1

| | Process Performances (excluding pitch) | | |
|---|---|---|---|
| | (Baseline Case) | Example 1 DMSC + 5 wt % Conversion | Example 2 DMSC + 8.5% Throughput |
| 540° C. Conversion, wt % (first 2 reactors) | 70% | 75% | 70% |
| Desulfurization, wt % | Baseline | Baseline + 2.7% | Baseline + 1.2% |
| CCR Conversion, wt % | Baseline | Baseline + 10.7% | Baseline + 7.5% |
| Asphaltene Conversion, wt % | Baseline | Baseline + 8.2% | Baseline + 4.4% |
| Nitrogen Removal, wt % | Baseline | Baseline + 1.9% | Baseline + 0.4% |
| Vanadium Removal, wt % | Baseline | Baseline + 1.0% | Baseline − 0.6% |
| Nickel Removal, wt % | Baseline | Baseline + 1.4% | Baseline − 1.3% |
| Sediment in ATB, wt % (IP-375) | Baseline | ≤Baseline | ≤Baseline |
| Hydrogen Consumption, Nm³/Sm³ | Baseline | 1.100 * Baseline | 1.038 * Baseline |

TABLE 2

| | Yields, wt % of Feed | | |
|---|---|---|---|
| | (Baseline Case) | Example 1 DMSC + 5 wt % Conversion | Example 2 DMSC + 8.5% Throughput |
| $H_2S$ | 5.35% | 5.51% | 5.41% |
| $NH_3$ | 0.30% | 0.31% | 0.30% |
| $H_2O$ | 0.09% | 0.10% | 0.08% |
| $C_1$-$C_4$ | 8.50% | 9.30% | 8.5% |
| $C_5$-180° C. | 19.5% | 22.7% | 19.8% |
| 180° C.-370° C. | 41.7% | 41.6% | 41.4% |
| 370° C.-540° C. | 15.3% | 14.4% | 15.7% |

TABLE 2-continued

| | Yields, wt % of Feed | | |
|---|---|---|---|
| | (Baseline Case) | Example 1 DMSC + 5 wt % Conversion | Example 2 DMSC + 8.5% Throughput |
| 540° C.+ | 0.4% | 0.4% | 0.4% |
| Pitch | 14.9% | 11.4% | 15.6% |

The improvemaents in the product properties of the unconverted oil are summarized in Table 3 below.

TABLE 3

| | | Gravity, °API | Sulfur, Wt % | Hydrogen, Wt % | CCR, Wt % |
|---|---|---|---|---|---|
| Baseline Case | Without DMSC | 3.1% | 2.59% | 9.50% | 29.90% |
| Example 1 | +5 wt % Conversion with DMSC | 5.1% | 2.38% | 9.55% | 25.38% |
| Example 2 | +8.5% Throughput with DMSC | 5.7% | 2.39% | 9.72% | 24.10% |

The estimated economic benefits of more efficiently produced and higher quality products compared to Baseline (without DMSC) are as follows:

Example 1: $12.39 MM per year

Example 2: $13.60 MM per year

An additional savings of $5-10 MM would accrue because of reduced equipment fouling, which results in fewer shutdowns and cleaning.

Example 3-5 compare the effects of using different combinations and omission of ebullated bed hydroprocessing reactor(s), heterogeneous catalyst, usage of dispersed metal sulfide catalyst particles, reactor conversion, overall conversion, solvent deasphalting, and addition sequences of catalyst precursor.

COMPARATIVE EXAMPLE 3

In Comparative Example 3, a system including three ebullated bed reactors that utilize a dual catalyst system comprising a heterogeneous catalyst and dispersed metal sulfide catalyst particles (DMSC) but wherein the system omits solvent deasphalting, is operated at high baseline conversion and moderate baseline dispersed metal sulfide catalyst concentration. The feed rate of heavy oil is 400 t/hr; the Baseline feed rate of DMSC is standard; and the overall conversion of heavy oil is 86.2%. The rate of production of converted products is 344.8 t/hr, and the rate of production of unconverted products is 55 t/hr.

COMPARATIVE EXAMPLE 4

In Comparative Example 4, a combined hydroprocessing and deasphalting system that utilizes a heterogeneous catalyst, but omits dispersed metal sulfide catalyst particles, includes two ebullated bed reactors that hydroprocess heavy oil and a single ebullated bed reactor that hydroprocesses deasphalted oil. The feed rate of heavy oil to the two heavy oil ebullated bed reactors is 400 t/hr, and the conversion of heavy oil is 70%. The rate of production of converted products by the heavy oil hydroprocessing subsystem is 280 t/hr, and the rate of production of unconverted products is 120 t/hr.

The unconverted products from the heavy oil hydroprocessing subsystem are subjected to solvent deasphalting, with a 60% lift of deasphalted oil, or 72 t/hr, and a rate of pitch production of 48 t/hr.

The feed rate of deasphalted oil to the ebullated bed reactor in the deasphalted oil hydroprocessing subsystem is 72 t/hr, and the conversion of deasphalted oil is 90%. Thus, the rate of production of converted products by the deasphalted oil hydroprocessing subsystem is 64.8 t/hr, and the rate of production of unconverted products is 7.2 t/hr.

The combined production of pitch and unconverted products by the combined heavy oil and deasphalted oil hydroprocessing system is therefore 55.2 t/hr, and the overall production of converted products is 344.8 t/hr, equaling an overall conversion of 86.2%.

EXAMPLE 5

In Example 5, a combined hydroprocessing and deasphalting system utilizes a dual catalyst system of heterogeneous catalyst and dispersed metal sulfide catalyst particles, including two ebullated bed reactors that hydroprocess heavy oil and a single ebullated bed reactor that hydroprocesses deasphalted oil. Example 5 also involves the sequential addition of a first amount of catalyst precursor (DMSC) to the heavy oil hydroprocessed by the first two ebullated bed reactors and a second amount of catalyst precursor (DMSC) to the deasphalted oil hydroprocessed by the third ebullated bed reactor.

The feed rate of heavy oil to the two heavy oil ebullated bed reactors is 400 t/hr; the feed rate of DMSC to the heavy oil is 60% of the Baseline; and the conversion of heavy oil is 75%. Thus, the rate of production of converted products by the heavy oil hydroprocessing subsystem is 300 t/hr, and the rate of production of unconverted products is 100 t/hr.

The unconverted products from heavy oil hydroprocessing are subjected to solvent deasphalting, with a 60% lift of deasphalted oil, or 60 t/hr, and a rate of pitch production of 40 t/hr. Essentially all of the dispersed metal sulfide catalyst particles used in the heavy oil hydroprocessing subsystem are removed in the pitch by the solvent deasphalting. Thus, essentially no dispersed metal sulfide catalyst particles remain in the deasphalted oil.

The feed rate of deasphalted oil to the ebullated bed reactor in the deasphalted oil hydroprocessing subsystem is 60 t/hr; the feed rate of a second amount of DMSC to the deasphalted oil is 4.5% of the Baseline; and the conversion of deasphalted oil is 95%, which can be increased without increased equipment fouling because of the presence of dispersed metal sulfide catalyst particles. Thus, the rate of production of converted products by the deasphalted oil hydroprocessing subsystem is 57 t/hr, and the rate of production of unconverted products is 3.0 t/hr.

The combined production of pitch and unconverted products by the combined heavy oil and deasphalted oil hydroprocessing system is therefore 43 t/hr, and the overall production of converted products is 357 t/hr, equaling an overall conversion of 89.2%.

Notably, Example 5 is able to increase the overall conversion and produce converted products at a higher rate compared to Comparative Examples 3 and 4. Surprisingly and unexpectedly, Example 5 is able to increase overall conversion of heavy oil and produce converted products at a higher rate compared to Comparative Example 3 even though less catalyst precursor is used overall.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of hydroprocessing heavy oil, comprising:
adding a first quantity of catalyst precursor to heavy oil and heating the heavy oil to form first dispersed metal sulfide catalyst particles in situ within the heavy oil;
hydroprocessing the heavy oil containing the first dispersed metal sulfide catalyst particles at hydroprocessing conditions to yield upgraded heavy oil containing converted products;
subjecting at least a portion of the upgraded heavy oil to solvent deasphalting to produce deasphalted oil and pitch, wherein at least a portion the first dispersed metal sulfide catalyst particles remain in the pitch after solvent deasphalting;
adding a second quantity of catalyst precursor to the deasphalted oil and heating the deasphalted oil to form second dispersed metal sulfide catalyst particles in situ within the deasphalted oil; and
hydroprocessing the deasphalted oil containing the second dispersed metal sulfide catalyst particles at hydroprocessing conditions to yield upgraded deasphalted oil containing converted products.

2. The method of claim 1, wherein the heavy oil is hydroprocessed in one or more hydroprocessing reactors utilizing the first dispersed metal sulfide catalyst particles and operating at hydroprocesing conditions.

3. The method of claim 1, wherein the heavy oil is hydroprocessed in one or more ebullated bed reactors utilizing the first dispersed metal sulfide catalyst particles and a heterogeneous ebullated bed catalyst and operating at hydroprocessing conditions.

4. The method of claim 1, wherein the deasphalted oil is hydroprocessed in one or more hydroprocessing reactors utilizing the second dispersed metal sulfide catalyst particles and operating at hydroprocesing conditions.

5. The method of claim 1, wherein the deasphalted oil is hydroprocessed in one or more ebullated bed reactors utilizing the second dispersed metal sulfide catalyst particles in combination with a heterogeneous ebullated bed catalyst, and optionally a residual portion of the first dispersed metal sulfide catalyst particles remaining in the deasphalted oil, and operating at hydroprocessing conditions.

6. The method of claim 1, further comprising separating the upgraded heavy oil into one or more lower boiling hydrocarbon fractions and one or more liquid hydrocarbon fractions and subjecting at least a portion of the one or more liquid hydrocarbon fractions to solvent deasphalting.

7. The method of claim 6, wherein separating the upgraded heavy oil into one or more lower boiling hydrocarbon fractions and one or more liquid hydrocarbon fractions is performed by one or more of flash separation, hot separation, atmospheric distillation, or vacuum distillation.

8. The method of claim 6, wherein the solvent deasphalting comprises:
introducing at least a portion of the one or more liquid hydrocarbon fractions and solvent into an extractor unit and performing solvent deasphalting;
removing a first stream containing deasphalted oil and a first portion of solvent from the extractor unit and subjecting the first stream to flash separation followed by vacuum stripping to produce the deasphalted oil and first recovered solvent;
removing a second stream containing pitch and a second portion of solvent from the extractor unit, heating the second stream, and subjecting the second stream to flash separation followed by vacuum stripping to produce the pitch and second recovered solvent; and
recycling at least a portion of the first recovered solvent and the second recovered solvent to the extractor unit, optionally with make-up solvent.

9. The method of claim 1, wherein the solvent used in the solvent deasphalting step comprises at least one paraffinic solvent.

10. The method of claim 1, wherein the first quantity of catalyst precursor added to the heavy oil is greater than the second quantity of catalyst precursor added to the deasphalted oil.

11. The method of claim 10, wherein the first quantity of catalyst precursor added to the heavy oil is greater than the second quantity of catalyst precursor added to the deasphalted oil by at least about 50%.

12. The method of claim 1, wherein the heavy oil includes a higher concentration of dispersed metal sulfide catalyst particles during hydroprocessing than the deasphalted oil.

13. The method of any one of claims 12, wherein the concentration of dispersed metal sulfide catalyst particles in the heavy oil during hydroprocessing is greater than the concentration of dispersed metal sulfide catalyst particles in the deasphalted oil during hydroprocessing by at least about 10%.

14. The method of claim 1, wherein a total quantity of catalyst precursor required to produce a given quantity of converted products using combined hydroprocessing and solvent deasphalting is less than a total quantity catalyst precursor required to produce the given quantity of converted products in the absence of solvent deasphalting and sequential addition of dispersed metal catalyst particles.

15. The method of claim 14, wherein the total quantity of catalyst precursor required to produce the given quantity of converted products is reduced by at least about 10% compared to the total quantity catalyst precursor required to produce the given quantity of converted products in the absence of solvent deasphalting and sequential addition of dispersed metal catalyst particles.

16. The method of claim 1, wherein a total quantity of pitch produced by solvent deasphalting following hydroprocessing the heavy oil in an ebullated bed reactor utilizing the dispersed metal sulfide particles and the ebullated bed catalyst is less than a total quantity of pitch produced by solvent deasphalting following hydroprocessing the heavy oil in the ebullated bed reactor utilizing the ebullated bed catalyst in the absence of the dispersed metal sulfide particles.

17. The method of claim 16, wherein the total quantity of pitch produced by solvent deasphalting following hydroprocessing the heavy oil in an ebullated bed reactor utilizing the dispersed metal sulfide particles and the ebullated bed catalyst is reduced by at least about 10% compared to the total quantity of pitch produced by solvent deasphalting following hydroprocessing the heavy oil in the ebullated bed reactor utilizing the ebullated bed catalyst in the absence of the dispersed metal sulfide particles.

18. The method of claim 1, wherein at least about 40% of the first dispersed metal sulfide particles remain in the pitch after solvent deasphalting.

19. The method of claim 1, further comprising recycling at least a portion of the pitch by adding it to the heavy oil that is hydroprocessed, the recycled pitch providing supplemental dispersed metal sulfide catalyst particles in addition to the first dispersed metal sulfide catalyst particles.

20. The method of claim 1, wherein the dispersed metal sulfide catalyst particles are less than 1 μm in size.

21. The method of claim 1, further comprising mixing the first quantity of catalyst precursor with a first diluent hydrocarbon to form a first diluted precursor mixture, blending the first diluted precursor mixture with the heavy oil to form conditioned heavy oil, and heating the conditioned heavy oil to decompose the catalyst precursor and form the first dispersed metal sulfide catalyst particles in situ within the heavy oil.

22. The method of claim 1, further comprising mixing the second quantity of catalyst precursor with a second diluent hydrocarbon to form a second diluted precursor mixture, blending the second diluted precursor mixture with the deasphalted oil to form conditioned deasphalted oil, and heating the conditioned deasphalted oil to decompose the catalyst precursor and form the second dispersed metal sulfide catalyst particles in situ within the deasphalted oil.

23. A system for hydroprocessing heavy oil, comprising:
one or more mixers for blending a first quantity of catalyst precursor with heavy oil to form a conditioned heavy oil that, when heated to a temperature above a decomposition temperature of the catalyst precursor, forms first dispersed metal sulfide catalyst particles in situ within the heavy oil;
one or more hydroprocessing reactors configured to hydroprocess the heavy oil containing the first dispersed metal sulfide catalyst particles at hydroprocessing conditions to yield upgraded heavy oil containing converted products;
a solvent deasphalting system configured to receive at least a portion of the upgraded heavy oil and solvent and perform solvent deasphalting to produce deasphalted oil and pitch, wherein the solvent deasphalting system comprises:
an extractor unit configured to receive at least a portion of the one or more liquid hydrocarbon fractions and solvent and perform solvent deasphalting;
a flash separator configured to receive a first stream containing deasphalted oil (DAO) and a first portion of solvent removed from the extractor unit followed by a DAO vacuum stripper, which are configured to produce the deasphalted oil and first recovered solvent;

a heater configured to receive a second stream containing pitch and a second portion of solvent removed from the extractor, followed by a flash separator unit, followed by a pitch vacuum stripper, which are configured to produce the pitch and second recovered solvent; and means for recycling at least a portion of the first recovered solvent and the second recovered solvent to the extractor, optionally with make-up solvent;

one or more mixers for blending a second quantity of catalyst precursor with the deasphalted oil to form a conditioned deasphalted oil that, when heated to a temperature above the decomposition temperature of the catalyst precursor, forms second dispersed metal sulfide catalyst particles in situ within the deasphalted oil; and one or more hydroproces sing reactors configured to hydroprocess the deasphalted oil at hydroprocessing conditions to yield upgraded deasphalted oil containing converted products.

24. The system of claim 23, wherein the one or more hydroprocessing reactors configured to hydroprocess the heavy oil comprise one or more ebullated bed reactors that utilize the first dispersed metal sulfide catalyst particles in combination with a heterogeneous ebullated bed catalyst.

25. The system of claim 23, wherein the one or more hydroprocessing reactors configured to hydroprocess the deasphalted oil comprise one or more ebullated bed reactors that utilize the second dispersed metal sulfide catalyst particles in combination with a heterogeneous ebullated bed catalyst.

26. The system of claim 23, further comprising one or more separators selected from flash separator, hot separator, atmospheric distillation tower, or vacuum distillation tower and configured to separate the upgraded heavy oil into one or more lower boiling hydrocarbon fractions and one or more liquid hydrocarbon fractions.

27. The system of claim 23, further comprising means for recycling at least a portion of the pitch by adding it to the heavy oil that is hydroprocessed and providing supplemental dispersed metal sulfide catalyst particles in addition to the first dispersed metal sulfide catalyst particles.

28. A method of hydroprocessing heavy oil, comprising:
adding a first quantity of catalyst precursor to heavy oil and heating the heavy oil to form first dispersed metal sulfide catalyst particles in situ within the heavy oil;
hydroprocessing the heavy oil containing the first dispersed metal sulfide catalyst particles at hydroprocessing conditions to yield upgraded heavy oil containing converted products;
subjecting at least a portion of the upgraded heavy oil to solvent deasphalting to produce deasphalted oil and pitch;
adding a second quantity of catalyst precursor to the deasphalted oil and heating the deasphalted oil to form second dispersed metal sulfide catalyst particles in situ within the deasphalted oil;
hydroprocessing the deasphalted oil containing the second dispersed metal sulfide catalyst particles at hydroprocessing conditions to yield upgraded deasphalted oil containing converted products; and
recycling at least a portion of the pitch by adding it to the heavy oil that is hydroprocessed, the recycled pitch providing supplemental dispersed metal sulfide catalyst particles in addition to the first dispersed metal sulfide catalyst particles.

29. A method of hydroprocessing heavy oil, comprising:
adding a first quantity of catalyst precursor to heavy oil and heating the heavy oil to form first dispersed metal sulfide catalyst particles in situ within the heavy oil;
hydroprocessing the heavy oil containing the first dispersed metal sulfide catalyst particles at hydroprocessing conditions to yield upgraded heavy oil containing converted products;
separating the upgraded heavy oil into one or more lower boiling hydrocarbon fractions and one or more liquid hydrocarbon fractions and subjecting at least a portion of the one or more liquid hydrocarbon fractions to solvent deasphalting, wherein the solvent deasphalting comprises:
introducing at least a portion of the one or more liquid hydrocarbon fractions and solvent into an extractor unit and performing solvent deasphalting;
removing a first stream containing deasphalted oil and a first portion of solvent from the extractor unit and subjecting the first stream to flash separation followed by vacuum stripping to produce the deasphalted oil and first recovered solvent;
removing a second stream containing pitch and a second portion of solvent from the extractor unit, heating the second stream, and subjecting the second stream to flash separation followed by vacuum stripping to produce the pitch and second recovered solvent; and
recycling at least a portion of the first recovered solvent and the second recovered solvent to the extractor unit, optionally with make-up solvent;
adding a second quantity of catalyst precursor to the deasphalted oil and heating the deasphalted oil to form second dispersed metal sulfide catalyst particles in situ within the deasphalted oil;
hydroprocessing the deasphalted oil containing the second dispersed metal sulfide catalyst particles at hydroprocessing conditions to yield upgraded deasphalted oil containing converted products.

30. A system for hydroprocessing heavy oil, comprising:
one or more mixers for blending a first quantity of catalyst precursor with heavy oil to form a conditioned heavy oil that, when heated to a temperature above a decomposition temperature of the catalyst precursor, forms first dispersed metal sulfide catalyst particles in situ within the heavy oil;
one or more hydroprocessing reactors configured to hydroprocess the heavy oil containing the first dispersed metal sulfide catalyst particles at hydroproces sing conditions to yield upgraded heavy oil containing converted products;
a solvent deasphalting system configured to receive at least a portion of the upgraded heavy oil and solvent and perform solvent deasphalting to produce deasphalted oil and pitch;
one or more mixers for blending a second quantity of catalyst precursor with the deasphalted oil to form a conditioned deasphalted oil that, when heated to a temperature above the decomposition temperature of the catalyst precursor, forms second dispersed metal sulfide catalyst particles in situ within the deasphalted oil;
one or more hydroproces sing reactors configured to hydroprocess the deasphalted oil at hydroprocessing conditions to yield upgraded deasphalted oil containing converted products; and
means for recycling at least a portion of the pitch by adding it to the heavy oil that is hydroprocessed and providing supplemental dispersed metal sulfide catalyst particles in addition to the first dispersed metal sulfide catalyst particles.

* * * * *